United States Patent
Kim et al.

(10) Patent No.: US 10,434,930 B2
(45) Date of Patent: Oct. 8, 2019

(54) LAMP FOR VEHICLE

(71) Applicant: SL Corporation, Daegu (KR)

(72) Inventors: DaeHyun Kim, Daegu (KR); Yong Deok Bae, Daegu (KR); Jaejoon Park, Daegu (KR); Cholmin Kim, Daegu (KR); Youngho Son, Daegu (KR); Jun Hyung Lee, Daegu (KR); Changwoo Baek, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/190,639

(22) Filed: Nov. 14, 2018

(65) Prior Publication Data

US 2019/0152378 A1 May 23, 2019

(30) Foreign Application Priority Data

Nov. 17, 2017 (KR) .................. 10-2017-0154235
Nov. 17, 2017 (KR) .................. 10-2017-0154236

(51) Int. Cl.
*B60Q 1/14* (2006.01)

(52) U.S. Cl.
CPC .......... *B60Q 1/143* (2013.01); *B60Q 2300/05* (2013.01); *B60Q 2300/41* (2013.01); *B60Q 2300/42* (2013.01)

(58) Field of Classification Search
None
See application file for complete search history.

(56) References Cited

U.S. PATENT DOCUMENTS

| 2016/0167566 A1* | 6/2016 | Tanaka ................. F21S 41/143 |
| | | 315/82 |
| 2016/0250964 A1 | 9/2016 | Takagaki et al. |
| 2018/0137375 A1* | 5/2018 | Takemura ............... B60R 21/00 |

FOREIGN PATENT DOCUMENTS

| EP | 2281719 A1 | 2/2011 |
| JP | 2011-031807 A | 2/2011 |
| JP | 2016-159709 A | 9/2016 |

* cited by examiner

*Primary Examiner* — Jany Richardson
(74) *Attorney, Agent, or Firm* — Mintz Levin Cohn Ferris Glovsky and Popeo, P.C.; Kongsik Kim; Jhongwoo Jay Peck

(57) ABSTRACT

A lamp for a vehicle is provided. The lamp for the vehicle includes a lamp component to form a beam pattern that includes a plurality of pattern areas, an image acquisition component to acquire a forward view image of the vehicle at a predetermined period, a recognition component to recognize a front vehicle from the forward view image, and a control component to control a light amount of at least one pattern area that corresponds to the front vehicle among the plurality of pattern areas to form a shadow area. In particular, the control component controls a light amount of at least one pattern area, including a width of the front vehicle and predetermined fixed ranges added to both sides of the front vehicle, among the plurality of pattern areas to form the shadow area.

11 Claims, 27 Drawing Sheets

LAMP FOR VEHICLE

This application claims priority from Korean Patent Application No. 10-2017-0154235 filed on Nov. 17, 2017 and from Korean Patent Application No. 10-2017-0154236 filed on Nov. 17, 2017, the disclosures of which are incorporated herein by reference in their entirety.

BACKGROUND

1. Field of the Disclosure

The present disclosure relates to a lamp for a vehicle, and more particularly, to a lamp for a vehicle configured to secure a field of view of a driver and form an adjusted shadow area in a beam pattern based on a location of a front vehicle.

2. Description of the Related Art

Generally, a vehicle includes a lamp with an illumination function for allowing an object disposed near the vehicle to be more easily seen when driving at low light conditions (e.g., night time), and a signaling function for informing a driving state of the vehicle to other vehicles or pedestrians. For example, a head lamp, a fog lamp, and the like are provided for illumination, and a turn signal lamp, a tail lamp, a brake lamp, a side marker, and the like are provided for signaling. Each lamp is regulated by regulations for installation criteria and standards to sufficiently ensure functions thereof.

Among them, the head lamp performs an important role in safe driving by irradiating light in the same direction as a driving direction of the vehicle to allow a front view of a driver to be secured when the vehicle is operated at night or through a dark place, such as a tunnel or the like.

Recently, demands for safety increase to enable safe driving, and to this end, since glare is generated toward a driver of a preceding vehicle or an opposite vehicle disposed in front along a driving direction of a vehicle to obstruct a field of view and thus possibility of vehicle accidents increase when the vehicle is operated at night with a head lamp thereof which is turned on, a method of securing the field of view of the driver and not obstructing the field of view of the driver of the preceding vehicle or the opposite vehicle is required.

SUMMARY

The present disclosure provides a lamp for a vehicle configured to form a shadow area at an area that corresponds to a location of a front vehicle based on a lighting mode selected by a driver. Further, the present disclosure provides a lamp for a vehicle configured to form a shadow area based on fixed ranges added to both sides of a front vehicle. In addition, the present disclosure provides a lamp for a vehicle configured to form a shadow area based on a variable range added to at least one of both sides of a front vehicle to have a width which is variable based on an angle variation rate of the front vehicle.

It should be noted that objects of the present disclosure are not limited to the above-mentioned objects, and other objects of the present disclosure will be apparent to those skilled in the art from the following descriptions.

A lamp for a vehicle according to an exemplary embodiment of the present disclosure may include a lamp component to form a beam pattern having a plurality of pattern areas, an image acquisition component to acquire a forward view image of the vehicle at a predetermined period, a recognition component to recognize a front vehicle from the forward view image, and a control component to control a light amount of at least one pattern area that corresponds to the front vehicle among the plurality of pattern areas to form a shadow area. In particular, the control component may control a light amount of at least one pattern area, including a width of the front vehicle and predetermined fixed ranges added to both sides of the front vehicle, among the plurality of pattern areas to form the shadow area.

Other details of the present disclosure are included in the detailed description and accompanying drawings which will be described below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and characteristics of the present disclosure and a method of achieving the same will be apparent by referring to exemplary embodiments which will be described below in detail with the accompanying drawings. However, the present disclosure is not limited to the exemplary embodiments which will be described below but may be implemented in various different forms, and the exemplary embodiments are provided merely so that the present disclosure is complete and those skilled in the art of the present disclosure can have a complete understanding of the scope of the present disclosure. The present disclosure is defined only by the scope of the claims. The same reference symbols refer to the same or similar components throughout the description.

Accordingly, in some exemplary embodiments, well-known processes, well-known structures, and well-known technologies are not specifically described to avoid ambiguous interpretation of the present disclosure. Further, terms used herein are merely for the purpose of describing exemplary embodiments and are not intended to limit the present disclosure. Singular forms are intended to also include plural referents unless the context clearly indicates otherwise. It should be further understood that the terms "comprise" and/or "comprising" do not preclude the presence or addition of one or more elements, steps, or operations other than the elements, steps, or operations specifically described. Further, the terms "and/or" include combinations of any or all of the mentioned items.

Further, exemplary embodiments which will be disclosed in the description will be described with reference to perspective views, cross-sectional views, side views, and/or schematic views which are ideal exemplary views of the present disclosure. Accordingly, shapes of the exemplary views may change based on a manufacturing technology, an allowable tolerance, and/or the like. Accordingly, the exemplary embodiments of the present disclosure are not limited to the particular shapes that are shown but include changes of shapes formed based on a manufacturing process. Further, in each of the views shown in the exemplary embodiments of the present disclosure, each of the elements may be expanded or downscaled in view of convenience of the description. The same reference symbols refer to the same or similar components throughout the description.

Figure 1:
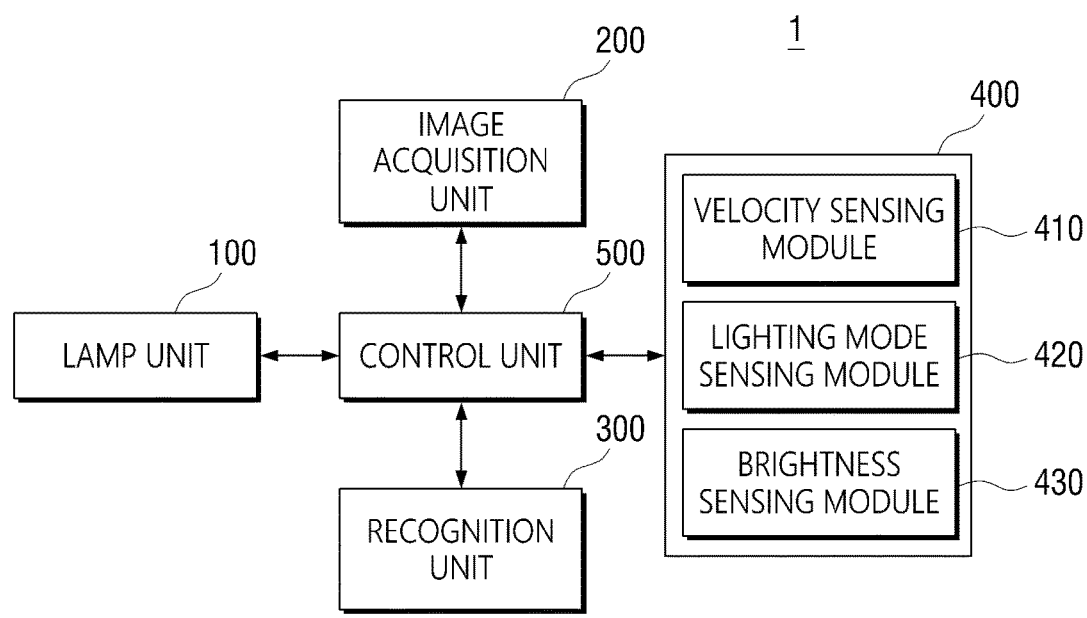
FIG. 1 is a block diagram illustrating a lamp for a vehicle according to an exemplary embodiment of the present disclosure.

Hereinafter, the present disclosure will be described with reference to the drawings for describing a lamp for a vehicle of exemplary embodiments of the present disclosure. FIG. 1 is a block diagram illustrating a lamp for a vehicle according to an exemplary embodiment of the present disclosure. Referring to FIG. 1, a lamp for a vehicle 1 according to the exemplary embodiment of the present disclosure may include a lamp component 100, an image acquisition component 200, a recognition component 300, a sensing component 400, and a control component 500.

Although an exemplary example is described in which the lamp for a vehicle 1 is used as a head lamp capable of irradiating light in a driving direction of a vehicle to allow a front view of the vehicle to be secured when the vehicle is operated at night or through a dark place such as a tunnel or the like in the exemplary embodiment of the present disclosure, the present disclosure is not limited thereto, and the lamp for a vehicle 1 may also be used as any of various lamps installed in a vehicle such as a tail lamp, a brake lamp, a fog lamp, a daytime driving lamp, a turn signal lamp, a position lamp, a backup lamp, and the like in addition to the head lamp.

Further, in the exemplary embodiment of the present disclosure, the lamp for a vehicle 1 may form a high beam pattern to secure a distant view in front of the vehicle, in which generation of glare toward a driver of a front vehicle may be prevented since a shadow area may be formed by reducing a light amount of light irradiated to an area that corresponds to a location of the front vehicle such as a preceding vehicle or an opposite vehicle or preventing light irradiation.

The lamp for a vehicle 1 of the present disclosure may be installed together with a lamp configured to form a low beam pattern when forming a high beam pattern, and the lamp for a vehicle 1 of the present disclosure may be turned off when the low beam pattern is desired to be formed and may be turned on together with the lamp configured to form the low beam pattern when forming the high beam pattern. The lamp component 100 may generate light for forming a beam pattern suitable for a purpose of the lamp for a vehicle 1 of the present disclosure.

Figure 2:
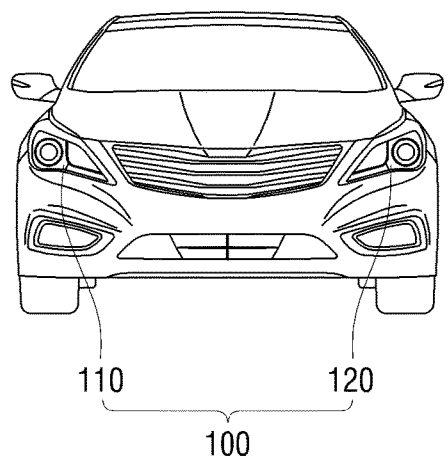
FIG. 2 is a schematic view illustrating a lamp component according to the exemplary embodiment of the present disclosure.

FIG. 2 is a schematic view illustrating the lamp component according to the exemplary embodiment of the present disclosure. Referring to FIG. 2, the lamp component 100 according to the exemplary embodiment of the present disclosure may include a first lamp module 110 and a second lamp module 120, and in the exemplary embodiment of the present disclosure, the first lamp module 110 and the second lamp module 120 may each be installed at both sides of the vehicle to generate light suitable for a purpose of the head lamp. Hereinafter, in the exemplary embodiment of the present disclosure, the first lamp module 110 may be installed at the right side of the front of the vehicle and the second lamp module 120 may be installed at the left side of the front of the vehicle.

Figure 3:
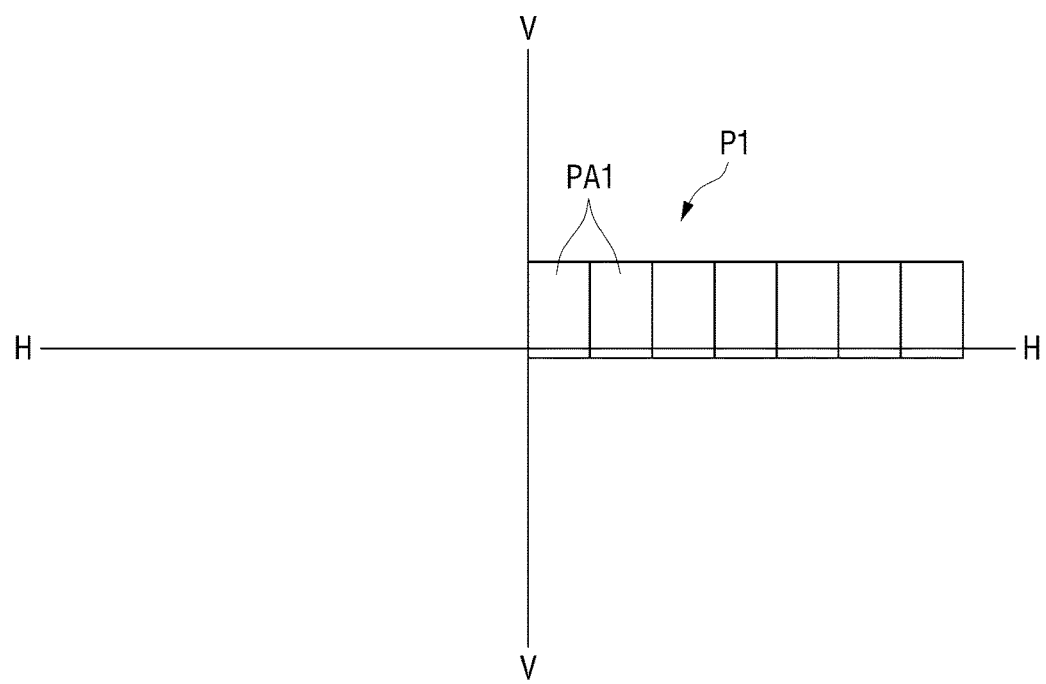
FIG. 3 is a schematic view illustrating a beam pattern formed by a first lamp module according to the exemplary embodiment of the present disclosure.

The first lamp module 110 may form a first beam pattern P1 that includes a plurality of pattern areas PA1 as shown in FIG. 3, the second lamp module 120 may form a second beam pattern P2 that includes a plurality of pattern areas PA2 to be symmetric with the first beam pattern P1 with respect to line V-V. Accordingly, a center of the front of the vehicle as shown in FIG. 4, and the first beam pattern P1 and the second beam pattern P2 may be combined to form a beam pattern P suitable for the purpose of the lamp for a vehicle 1 of the present disclosure, e.g., a high beam pattern as shown in FIG. 5.

Figure 4:
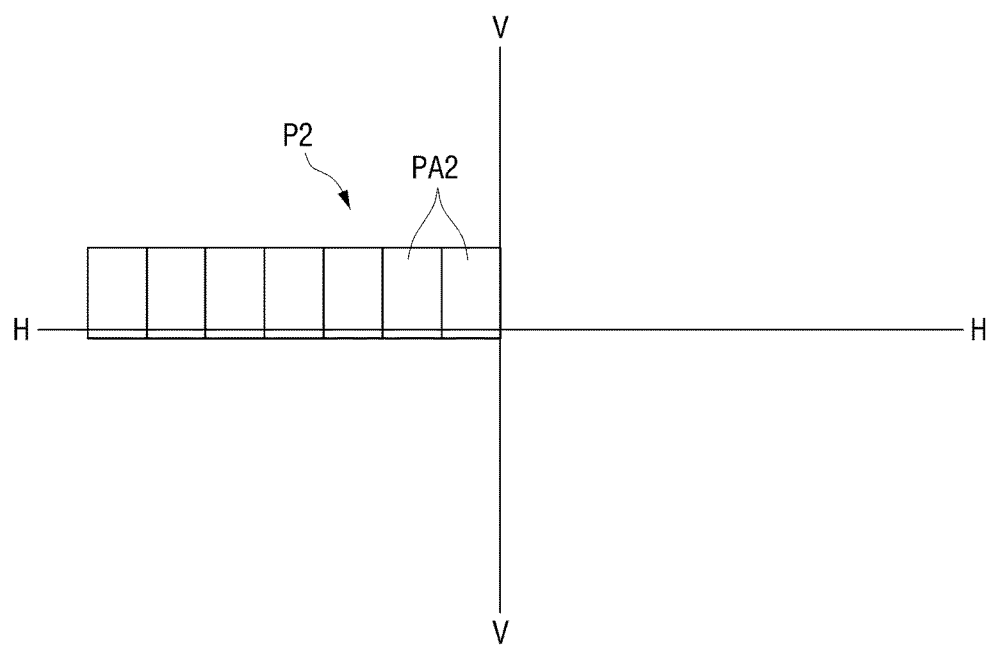
FIG. 4 is a schematic view illustrating a beam pattern formed by a second lamp module according to the exemplary embodiment of the present disclosure.
Figure 5:
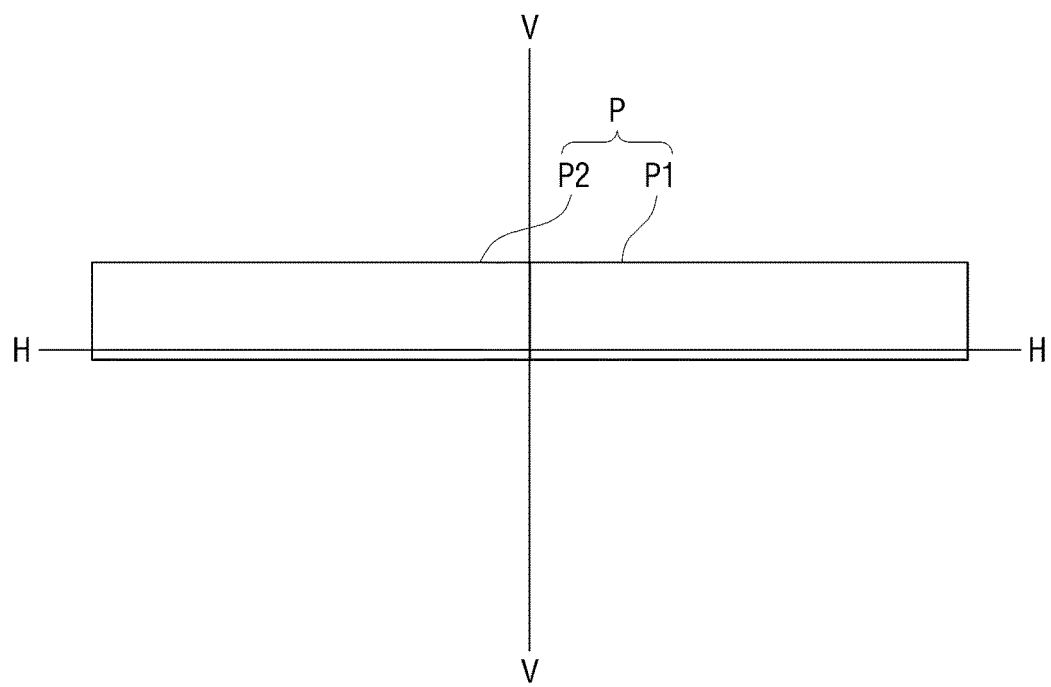
FIG. 5 is a schematic view illustrating a beam pattern formed by a lamp component according to the exemplary embodiment of the present disclosure.

In the above-described FIGS. 3 and 4, although an example is described in which the plurality of pattern areas PA1 and PA2 are divided and formed, the present disclosure is not limited thereto, and the plurality of pattern areas PA1 of the first beam pattern P1 and the plurality of pattern areas PA2 of the second beam pattern P2 may be formed so that parts of the pattern areas which are close (e.g., adjacent) to each other may overlap each other, since an unnecessary shadow area may be formed when the pattern areas adjacent to each other are spaced apart from each other. Further, the first beam pattern P1 and the second beam pattern P2 may be formed to partially overlap each other at a center part of the beam pattern P to improve the brightness to improve a far-field view of the vehicle.

The first lamp module 110 and the second lamp module 120 may include a plurality of light emitting areas (not shown) from which light for forming the plurality of pattern areas PA1 and PA2 is generated, and each of the plurality of light emitting areas may be understood as a light emitting surface of a light source, a light emitting lens, an emission surface of a light guide, or the like.

Meanwhile, in the exemplary embodiment of the present disclosure, although an example is described in which the plurality of pattern areas PA1 and PA2 are disposed in a single row in a width direction of the vehicle, the present disclosure is not limited thereto, and the number of the plurality of pattern areas PA1 and PA2 may be varied based on the shape or size of the beam pattern required to be suitable for the purpose of the lamp for a vehicle 1 of the present disclosure, and a part of the beam pattern P may have pattern areas disposed in rows different from rows of another part. The above-described first beam pattern P1 and second beam pattern P2, and the beam pattern P, which may be formed by combination of the first beam pattern P1 and the second beam pattern P2, may be understood as beam patterns formed when light is irradiated on a screen disposed in front of the vehicle at a predetermined distance.

In the lamp component 100, at least one of the plurality of light emitting areas of the first lamp module 110 and the second lamp module 120 may be turned off based on the location of the front vehicle, and in this case, since light may be not generated from the light emitting area which is turned off, and thus at least one of the plurality of pattern areas PA1 of the first beam pattern P1 and the plurality of pattern areas PA2 of the second beam pattern P2 may be not formed, the shadow area may be formed. A detailed description of the above will be described below.

In the exemplary embodiment of the present disclosure, although an example is described in which at least one of the plurality of light emitting areas of the first lamp module 110 and the second lamp module 120 is turned off to form the shadow area, the present disclosure is not limited thereto, and a light amount of light generated from at least one of the plurality of light emitting areas of the first lamp module 110 and the second lamp module 120 may be decreased to form the shadow area.

Figure 6:
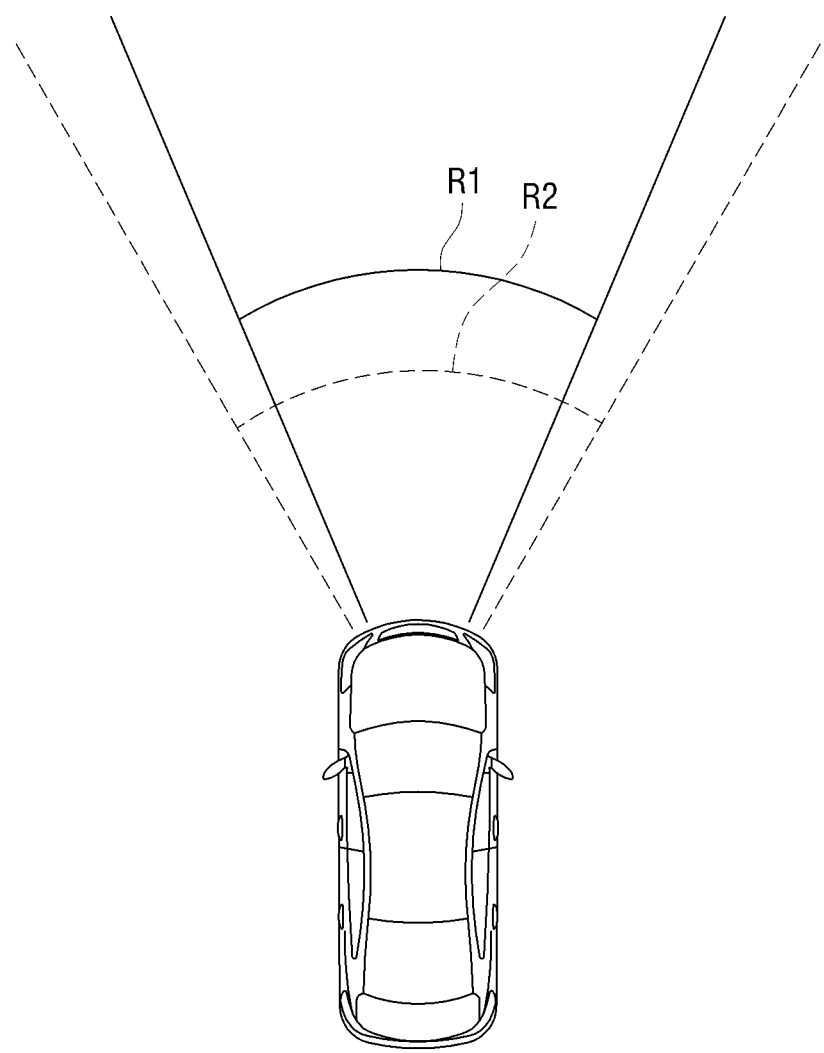
FIG. 6 is a schematic view illustrating a light irradiation range of the lamp component according to the exemplary embodiment of the present disclosure and an image acquisition range of an image acquisition component.

The image acquisition component 200 may include at least one camera capable of acquiring an image in front of the vehicle, and the number of cameras or a view angle of the camera may be varied based on an image acquisition range. In the exemplary embodiment of the present disclosure, as shown in FIG. 6, the image acquisition component 200 may include an image acquisition range R2 greater than a light irradiation range R1 of the lamp component 100 to include the light irradiation range R1 of the lamp component 100 since a shadow area of a front vehicle at a location out of the image acquisition range R2 may be more difficult to form when the light irradiation range R1 is greater than the image acquisition range R2. Accordingly, a shadow area may be formed based on a location of a passing vehicle by allowing the passing vehicle to be recognized before the vehicle passing from the rear thereof enters the light irradiation range R1. A detailed description of the above will be described below.

The image acquisition component 200 may acquire a forward view image at a predetermined period, and the period of acquiring the front image may vary based on a road environment or a operating velocity of the vehicle.

The recognition component 300 may recognize the front vehicle from the front image acquired by the image acquisition component 200. For example, the recognition component 300 may recognize the location and width of the front vehicle, a distance to the front vehicle, the number of front vehicles, and the like from the forward view image on the basis of a wavelength or width of light generated from a head lamp of the opposite vehicle or a tail lamp of the preceding vehicle.

The recognition component 300 may determine an angle between the instant vehicle and the front vehicle from the front image, and the number of angles determined by the recognition component 300 may be used by the control component 500 to determine the number of front vehicles. Hereinafter, "the instant vehicle" may refer to the vehicle that includes a lamp for a vehicle according to exemplary embodiments of the present disclosure.

The recognition component 300 may calculate the angle between the instant vehicle and the front vehicle with respect to a reference line parallel to a driving direction of the instant vehicle, and in the exemplary embodiment of the present disclosure, the image acquisition component 200 may be installed at a center of the instant vehicle and thus the reference line may pass through the center of the instant vehicle in the driving direction of the instant vehicle.

Figure 7:
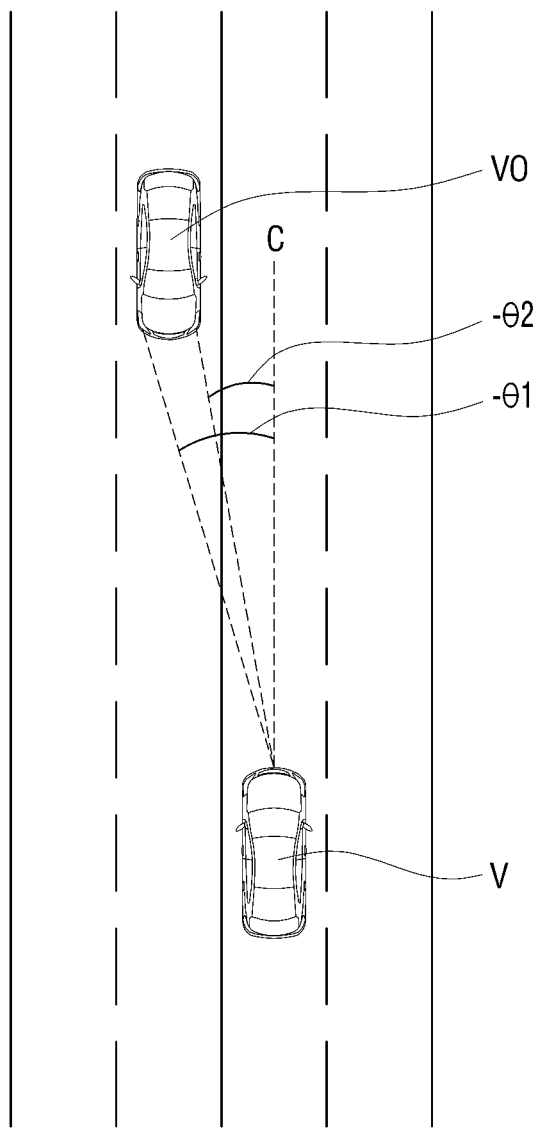
FIG. 7 is a schematic view illustrating an angle between an instant vehicle and an opposite vehicle according to the exemplary embodiment of the present disclosure.
Figure 8:
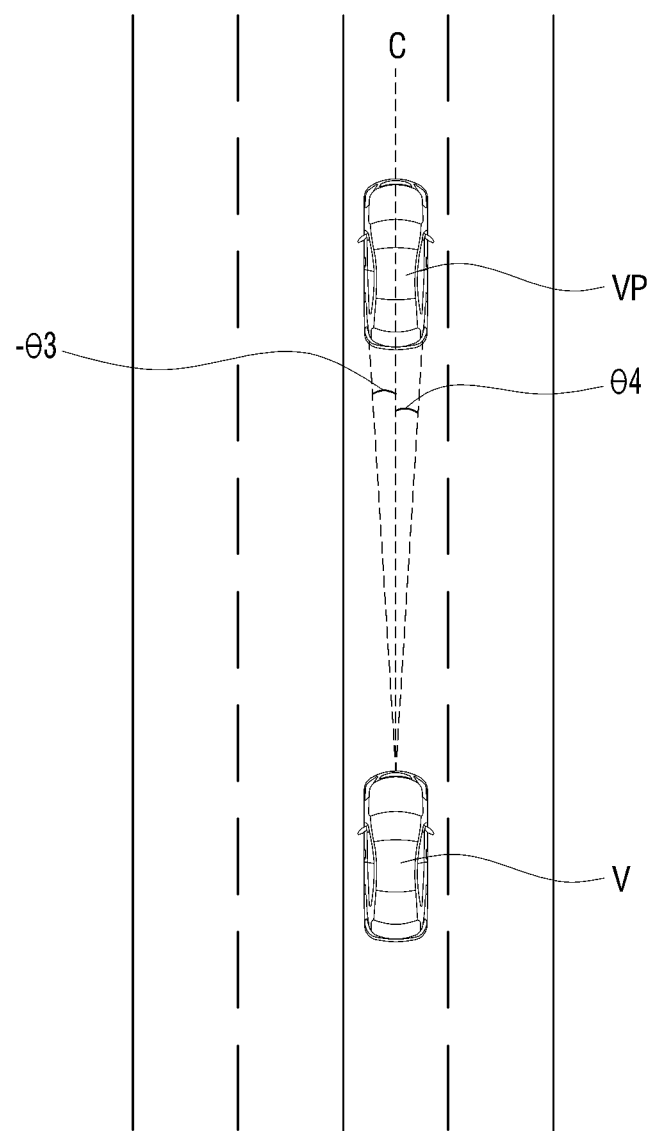
FIG. 8 is a schematic view illustrating an angle between the instant vehicle and a preceding vehicle according to the exemplary embodiment of the present disclosure.

For example, the recognition component 300 may determine angles −θ1 and −θ2 which may be formed respectively between a reference line C which passes through a center of the instant vehicle V in a longitudinal direction of the instant vehicle V and a left head lamp and a right head lamp of an opposite vehicle VO when the opposite vehicle VO is disposed in front of the instant vehicle V as shown in FIG. 7. Further, the recognition component 300 may determine angles −θ3 and θ4 which may be formed respectively between a reference line C parallel to the longitudinal direction of the instant vehicle V and a left tail lamp and a right tail lamp of a preceding vehicle VP when the preceding vehicle VP is disposed in front of the instant vehicle V as shown in FIG. 8.

In this case, lateral sides of each the opposite vehicle VO and the preceding vehicle VP may be determined with respect to directions in which the opposite vehicle VO and the preceding vehicle VP are each viewed from the instant vehicle V. In particular, the lateral sides of the opposite vehicle VO may be viewed from the instant vehicle V and lateral sides with respect to a driving direction of the opposite vehicle VO may be opposite to each other.

Further, the angles determined by the recognition component 300 may have a positive value or a negative value to indicate directions with respect to the reference line C parallel to the driving direction of the instant vehicle V, and an example is described in which an angle in a left direction with respect to the reference line C is indicated as a negative value, and an angle in a right direction with respect to the reference line C is indicated as a positive value.

For example, the above-described angles −θ1, −θ2, and −θ3 may be understood as angles in the left direction with respect to the reference line C, the angle θ4 may be understood as an angle in the right direction with respect to the reference line C, and a case in which an angle of the front vehicle increases or decreases may be understood as a case in which an angle between the front vehicle and the reference line C increases or decreases.

The sensing component 400 may sense various states of the vehicle, and in the exemplary embodiment of the present disclosure, although an example is described in which the sensing component 400 includes a velocity sensing module 410 configured to sense the driving velocity of the vehicle, a lighting mode sensing module 420 configured to sense a lighting mode, and a brightness sensing module 430 configured to sense surrounding brightness, the present disclosure is not limited thereto, and the sensing component 400 may sense various states required to control the lamp component 100.

The velocity sensing module 410 may sense the driving velocity of the vehicle by a vehicle velocity sensor, an acceleration sensor, a GPS sensor, or the like, the lighting mode sensing module 420 may sense a lighting mode selected by operation signals (e.g., positions) of a lighting switch, a lever, or the like provided in the vehicle, and the brightness sensing module 430 may sense brightness around the vehicle by an illuminance sensor or the like.

In this case, the lighting mode may include a first mode for forming the low beam pattern, a second mode for forming the high beam pattern, and a third mode which adjusts the beam pattern based on a driving environment of the vehicle, and the lighting mode sensing module 420 may sense at least one mode among the above-described first to third modes. In the exemplary embodiment of the present disclosure, the third mode may be understood as an automatic mode, e.g., a mode which may automatically adjust the beam pattern based on the driving environment of the vehicle to form a shadow area based on the location of the front vehicle when the low beam pattern or the high beam pattern is formed. In the exemplary embodiment of the present disclosure, although an example is described in which the lighting mode includes the first to third modes, since the above is merely an example for understanding the present disclosure, the present disclosure is not limited thereto, and the lighting mode may be varied based on the type of the beam pattern.

The control component 500 may control the lamp component 100 and form the shadow area to prevent or reduce the generation of the glare toward the driver of the front vehicle based on the location of the front vehicle when the front vehicle is recognized by the recognition component 300. In the exemplary embodiment of the present disclosure, the control component 500 may control the lamp component 100 to form the shadow area when both the second mode and the third mode are selected together as the lighting mode, since the lamp component 100 forms the high beam pattern and automatically forms the shadow area based on the location of the front vehicle in the embodiment of the present disclosure.

The control component 500 may output control signals which control brightness of light generated from at least one of the plurality of light emitting areas of the first lamp module 110 and the second lamp module 120, and the control signals output from the control component 500 may adjust currents applied to a light source of each of the first lamp module 110 and the second lamp module 120 to turn on or turn off the light source or adjust an amount of the light output. Depending on the type of the light source, the amount of the light output may be varied by decreasing the generated lighted amount and/or deflecting a portion of the generated light to different directions. In the exemplary embodiment of the present disclosure, the control component 500 may turn off at least one of the plurality of light emitting areas of the first lamp module 110 and the second lamp module 120 to form the shadow area.

The control component 500 may allow the shadow area to be formed in a width that corresponds to a width of the front vehicle, and also a predetermined fixed range may be added to at least one of both sides of the front vehicle based on the location of the front vehicle.

In the exemplary embodiment of the present disclosure, the control component 500 may allow the shadow area to be formed in the width of front vehicle with respect to the range with the fixed range added, to prevent the generation of the glare toward the driver of the front vehicle by securing a buffer space (e.g., operational margin) in the shadow area, since the front vehicle may also move during a time while the recognition component 300 recognizes the front vehicle from the forward view image acquired by the image acquisition component 200 and the control component 500 controls the lamp component 100 to form the shadow area based on the location of the recognized front vehicle.

In other words, when the control component 500 forms a shadow area based on the width of the front vehicle, since glare toward the driver of the front vehicle may be generated when the front vehicle moves out of the shadow area while the control component 500 controls the lamp component 100, the generation of the glare toward the driver of the front vehicle may be prevented by adding the predetermined fixed ranges to both sides of the front vehicle front in consideration of movement of the vehicle.

Figure 9:
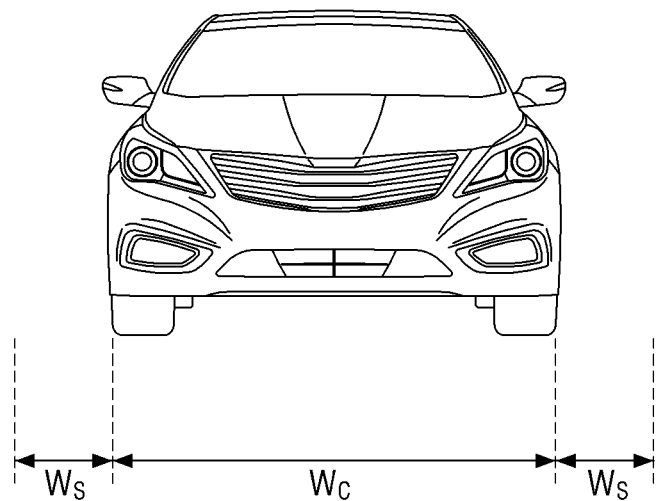
FIG. 9 is a schematic view illustrating fixed ranges added to both sides of the front vehicle according to the exemplary embodiment of the present disclosure.
Figure 10:
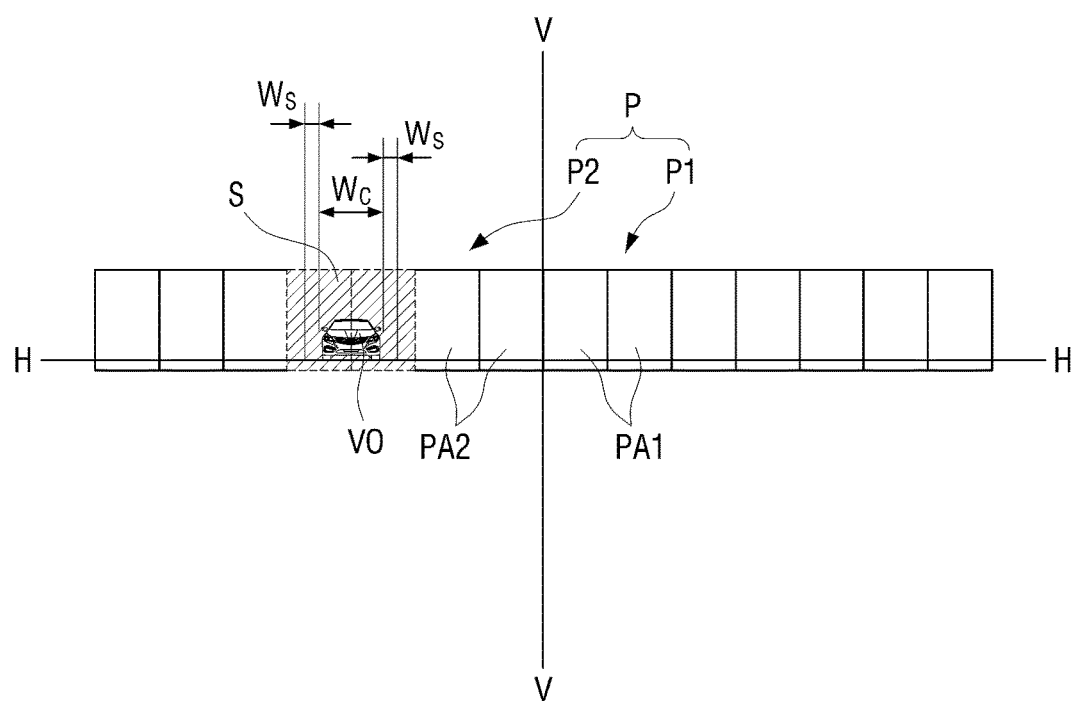
FIGS. 10 and 11 are schematic views illustrating a shadow area according to a location of the opposite vehicle according to the exemplary embodiment of the present disclosure.
Figure 11:
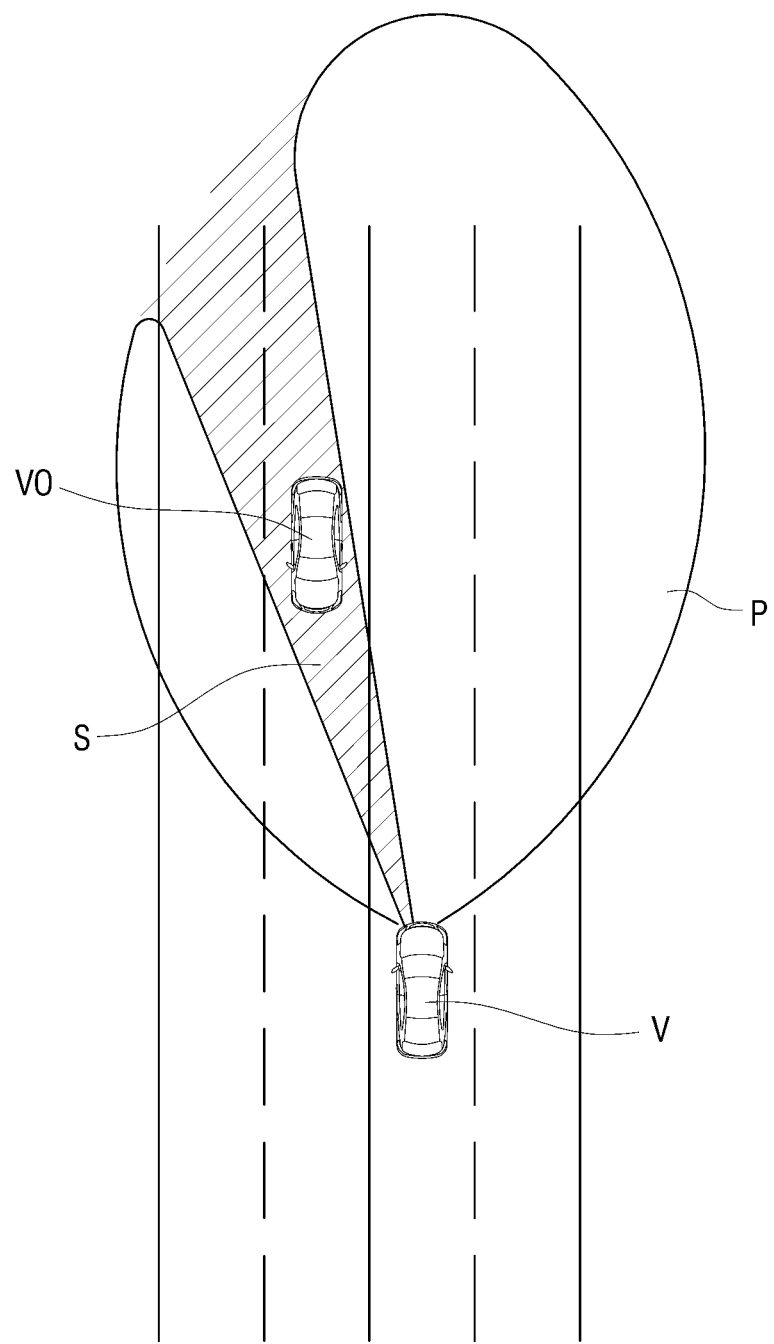
Figure 12:
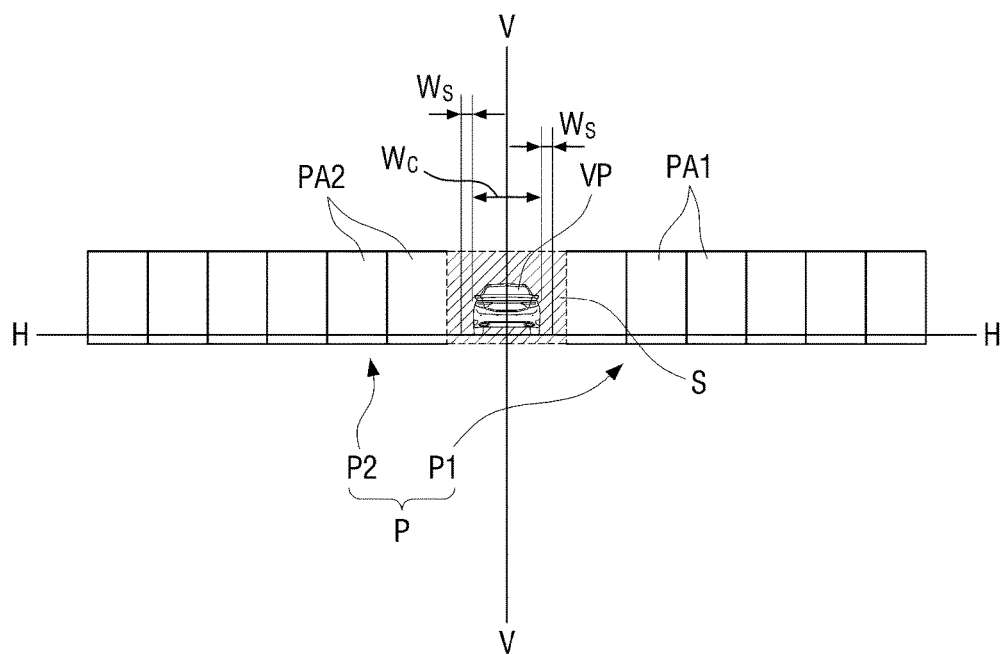
FIGS. 12 and 13 are schematic views illustrating a shadow area according to a location of the preceding vehicle according to the exemplary embodiment of the present disclosure.
Figure 13:
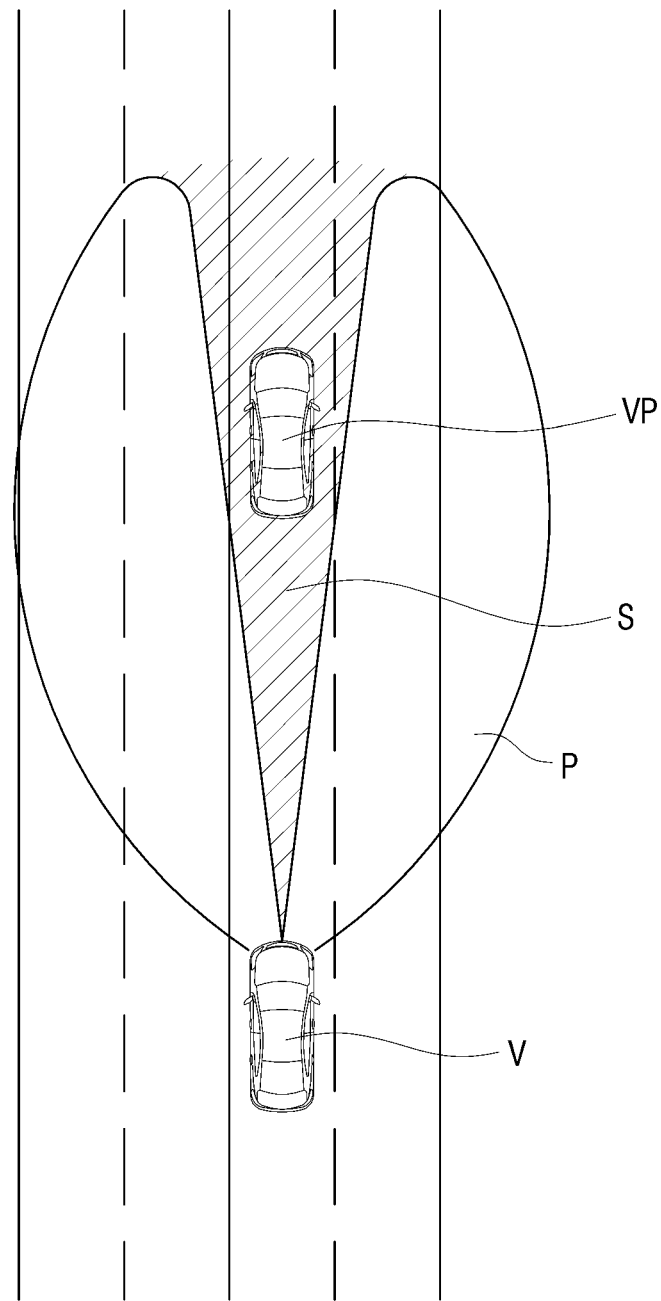

For example, the control component 500 may add fixed ranges Ws, each having a predetermined width from both sides of the opposite vehicle, to a width Wc of the opposite vehicle VO as shown in FIG. 9 and may turn off a light emitting area that forms a pattern area which includes at least a part of each of a width Wc and fixed ranges Ws of the front vehicle among the plurality of pattern areas PA1 and PA2 included in the beam pattern P, to form a shadow area S as shown in FIGS. 10 and 11. Further, as shown in FIGS. 12 and 13, the control component 500 may turn off a light emitting area that forms a pattern area which includes at least a part of each of a width Wc and fixed ranges Ws of the preceding vehicle VP among the plurality of pattern areas PA1 and PA2, to form the shadow area S.

Figure 14:
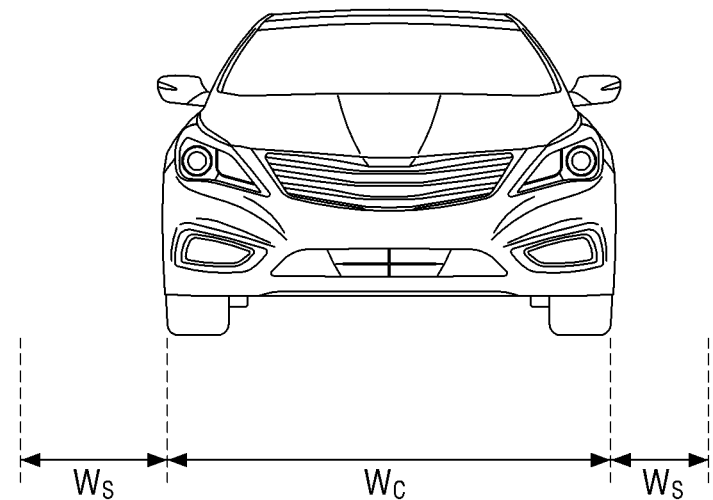
FIG. 14 is a schematic view illustrating fixed ranges added to both sides of the front vehicle according to the exemplary embodiment of the present disclosure to have different widths.

In addition, when the fixed ranges are added to both sides of the front vehicle, the fixed ranges added to both sides of the front vehicle may have different widths based on the location of the front vehicle. For example, as shown in FIG. 14, in the opposite vehicle disposed in front of the instant vehicle, the fixed range in a direction in which an opposite vehicle is disposed may have a greater width than the other fixed range with respect to the instant vehicle which is capable of causing direct glare to a driver of the opposite vehicle. In FIG. 14, although an example is described in which the fixed ranges added to both sides of the opposite vehicle are different from each other, fixed ranges added to both sides of the preceding vehicle may also have different widths like those of the opposite vehicle.

The control component 500 may output control signals to control the lamp component 100 when the driving velocity of the vehicle is greater than or equal to a first reference velocity as a sensing result of the velocity sensing module 410 and may turn off the lamp component 100 when the driving velocity of the vehicle is less than a second reference velocity which is less than the first reference velocity. In other words, the control component 500 may allow the far-field view to be secured and the shadow area to be formed based on the location of the front vehicle when the driving velocity of the vehicle is greater than or equal to the first reference velocity which is a relatively high velocity. Alternatively, the control component 500 may turn off the lamp component 100 when the driving velocity of the vehicle is less than the second reference velocity which is a relatively low velocity since securing the distant view may be less important at low vehicle velocities.

In this case, the control component 500 may maintain a state in which the lamp component 100 is turned on when the driving velocity of the vehicle increases to be greater than or equal to the first reference velocity and then decreases to a velocity between the first reference velocity and the second reference velocity after the lamp component 100 is turned on, and may turn off the lamp component 100 when the driving velocity of the vehicle decreases to be less than the second reference velocity.

Further, the control component 500 may control the lamp component 100 when the number of front vehicles recognized by the recognition component 300 is smaller than or equal to a predetermined number, since almost every light emitting area included in the lamp component 100 may be required to be turned off, and thus effects such as prevention of the glare by the forming of the shadow area and the like may be difficult to acquire when the number of front vehicles is greater than the predetermined number. In this case, the number of front vehicles to which the control component 500 turns off the lamp component 100 may be varied based on a width in which the beam pattern is formed, the road environment, or the like, the lamp component 100 may be turned on when the number of front vehicles is smaller than or equal to, for example, eight, and the lamp component 100 may be turned off when the number of front vehicles is greater than or equal to, for example, nine.

Further, the control component 500 may turn on the lamp component 100 to form the shadow area based on the location of the front vehicle when the surrounding brightness of the vehicle is lower than or equal to standard reference brightness, and since an effect of preventing the generation of the glare may be difficult to acquire, the control component 500 may turn off the lamp component 100 when the surrounding brightness of the vehicle is greater than the reference brightness.

Figure 15:
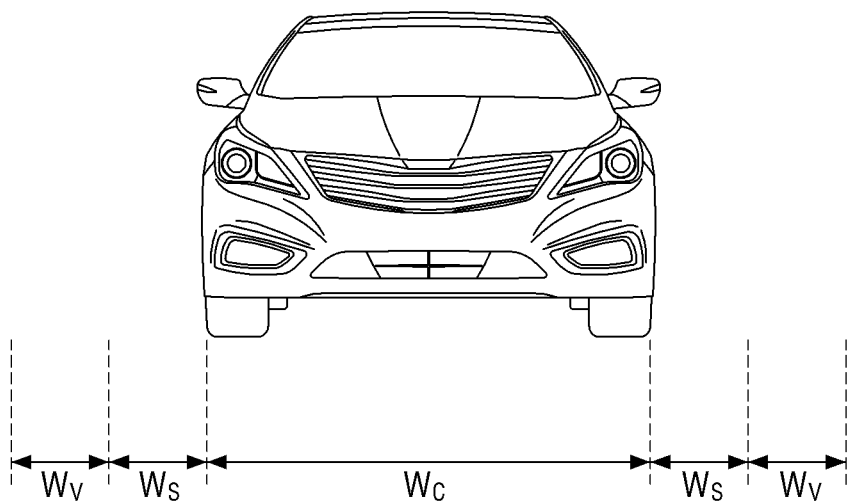
FIG. 15 is a schematic view illustrating the fixed ranges and variable ranges added to both sides of the front vehicle according to the exemplary embodiment of the present disclosure.

Moreover, as shown in FIG. 15, the control component 500 may form the shadow area at the at least one of both sides of the front vehicle in addition to the fixed ranges Ws with respect to a scope to which variable ranges Wv, having widths that vary by an angle variation rate based on the location of the front vehicle, e.g., variation of the angle between the instant vehicle and the front vehicle at a predetermined period, may be added.

In FIG. 15, although an example is described in which the variable ranges Wv are added to both sides of the front vehicle, the present disclosure is not limited thereto, and widths of the variable ranges Wv applied to respective sides of the front vehicle may increase or decrease based on an angle variation rate between the instant vehicle and the front vehicle, and when the variable ranges Wv decrease, the above-described fixed ranges Ws may also decrease.

As described above, when a shadow area is formed with respect to a range in which the variable ranges Wv are added to the fixed ranges Ws, a case in which the shadow area is formed becomes excessive or insufficient based on the location of the front vehicle may be prevented. For example, when the fixed ranges Ws have relatively small widths, the shadow area may become insufficient when the front vehicle becomes close, and when the fixed ranges Ws have relatively large widths, the shadow area may be formed excessively when the front vehicle becomes distant. Conversely, an adjusted (e.g., optimum) shadow area may be formed through the variable ranges Wv, which has the widths that vary by the angle variation rate between the instant vehicle and the front vehicle, in the exemplary embodiment of the present disclosure.

Figure 16:
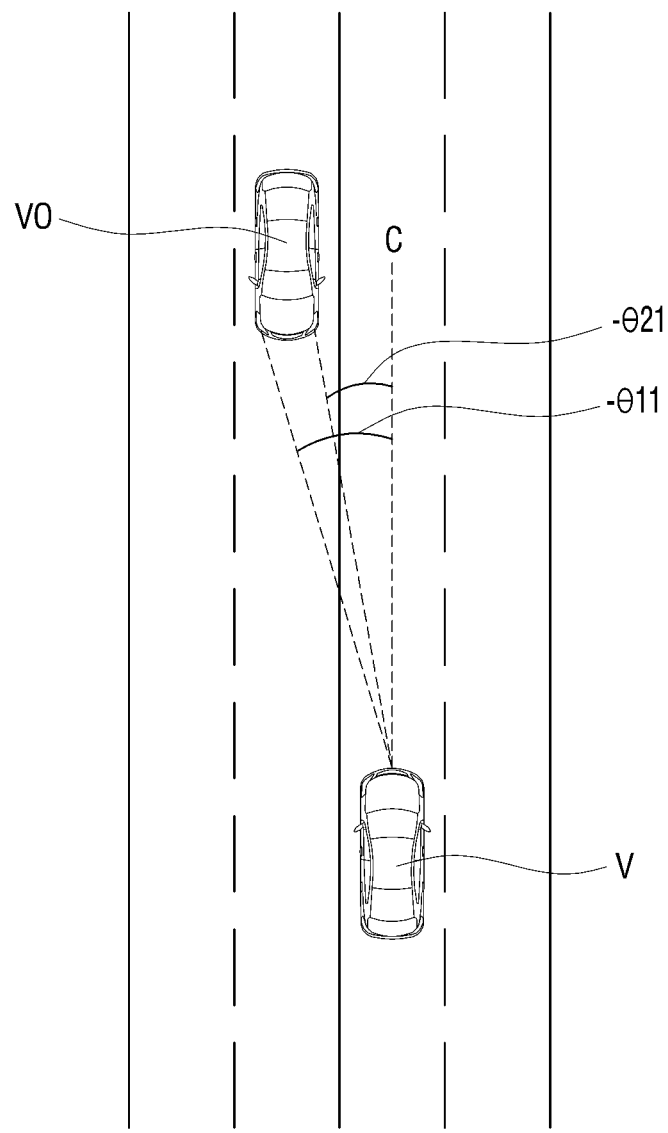
FIGS. 16 and 17 are schematic views illustrating an angle between the instant vehicle and the opposite vehicle according to the location of the opposite vehicle according to the exemplary embodiment of the present disclosure.
Figure 17:
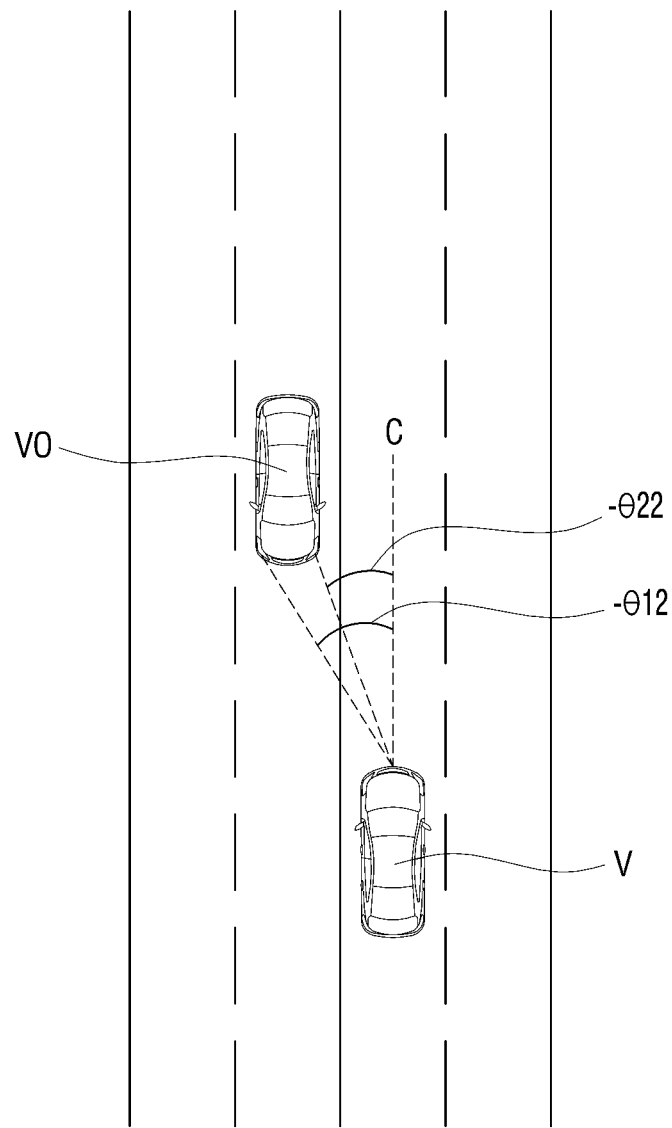

The control component 500 may calculate an angle variation rate through differences between angles $-\theta 11$ and $-\theta 21$ formed respectively by the left head lamp and the right head lamp of the opposite vehicle VO with respect to the reference line C of the instant vehicle V at a previous time step with respect to a predetermined period as shown in FIG. 16, and angles $-\theta 12$ and $-\theta 22$ formed respectively by the left head lamp and the right head lamp of the opposite vehicle VO with respect to the reference line C of the instant vehicle V at the present time step as shown in FIG. 17, and when the angle variation rate is greater than or equal to a threshold value, the widths of the variable ranges Wv to be added to both sides of the opposite vehicle VO at a next time step with respect to the predetermined period may be determined.

In other words, the control component 500 may determine that the opposite vehicle VO moves in a left direction with respect to the instant vehicle V when differences between the angles at the present time step and the angles between the previous time step, that is, $-\theta 12-(-\theta 11)$ and $-\theta 22-(-\theta 21)$ have negative values with respect to the present time step, and may determine that the shadow area may be difficult to be formed sufficiently at the above-described fixed ranges Ws when the differences are greater than or equal to the threshold value. In this case, to the control component 500 may form the shadow area at the next time step with respect to a range in which the variable range Wv is added to the left side of the opposite vehicle VO in addition to the fixed range Ws.

The case in which the angle variation rate of the opposite vehicle VO between the previous time step and the present time step is greater than or equal to the threshold value may be understood as a case in which a driving velocity of at least one of the instant vehicle V or the opposite vehicle VO increases and thus a distance between the instant vehicle V and the opposite vehicle VO decreases, and in this case, since location variation of the opposite vehicle VO may be relatively larger, the variable ranges Wv may be added to the fixed ranges Ws to prevent generation of glare toward a driver of the opposite vehicle VO at the next time step. Since the variable range Wv may decrease to the fixed range Ws at the right side of the opposite vehicle VO, the right side of the front vehicle may have the fixed range Ws added thereto without the variable range Wv.

Figure 18:
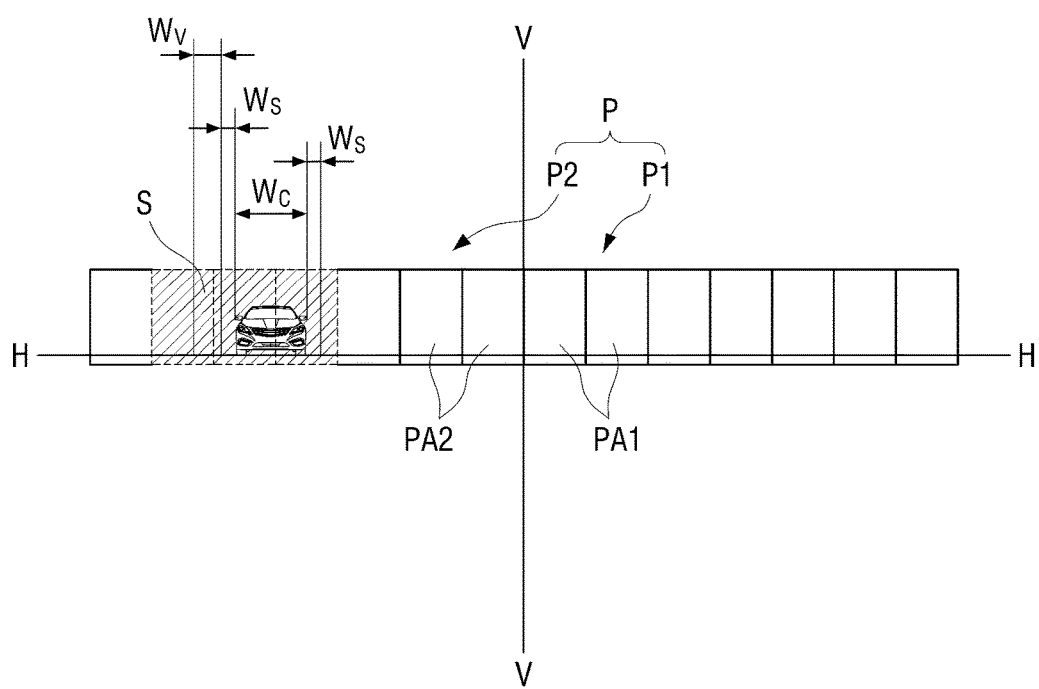
FIGS. 18 and 19 are schematic views illustrating a shadow area according to an angle variation rate of the opposite vehicle according to the exemplary embodiment of the present disclosure.
Figure 19:
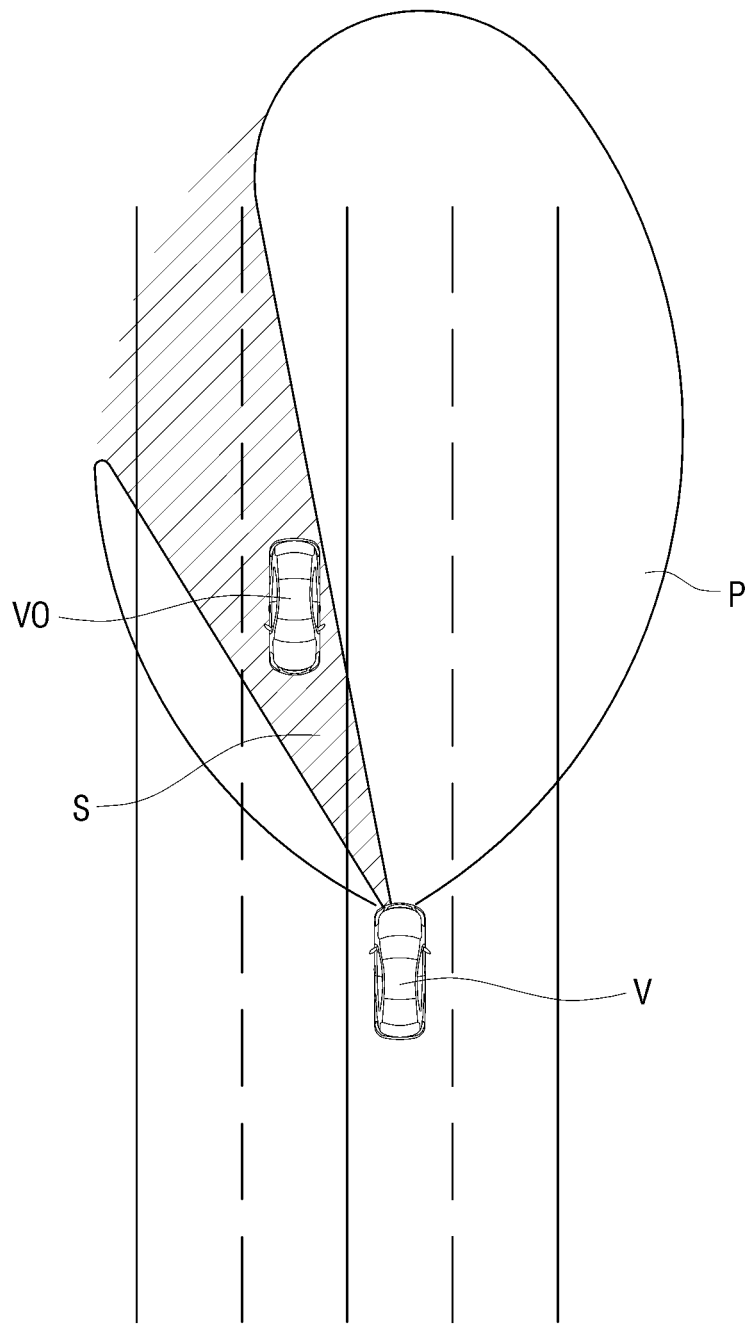

As described above, when the angle variation rate of the opposite vehicle VO is greater than or equal to the threshold value, the control component 500 may turn off the light emitting area that forms the pattern area, which includes the width We of the opposite vehicle VO, the fixed ranges Ws added to both sides of the opposite vehicle VO, and the variable range Wv added to the left side of the opposite vehicle VO among the plurality of pattern areas PA1 and PA2, included in the beam pattern P to form the shadow area S at the next time step as shown in FIGS. 18 and 19. Accordingly, the shadow area at the left side of the opposite vehicle VO may have a relatively larger width than the width of the shadow area at the right side. In the present disclosure, although a case in which the on-coming opposite vehicle approaches from the left side of the instant vehicle has been described as an example, the side of the on-coming opposite vehicle may vary depending on the road usage customs and regulations.

Figure 20:
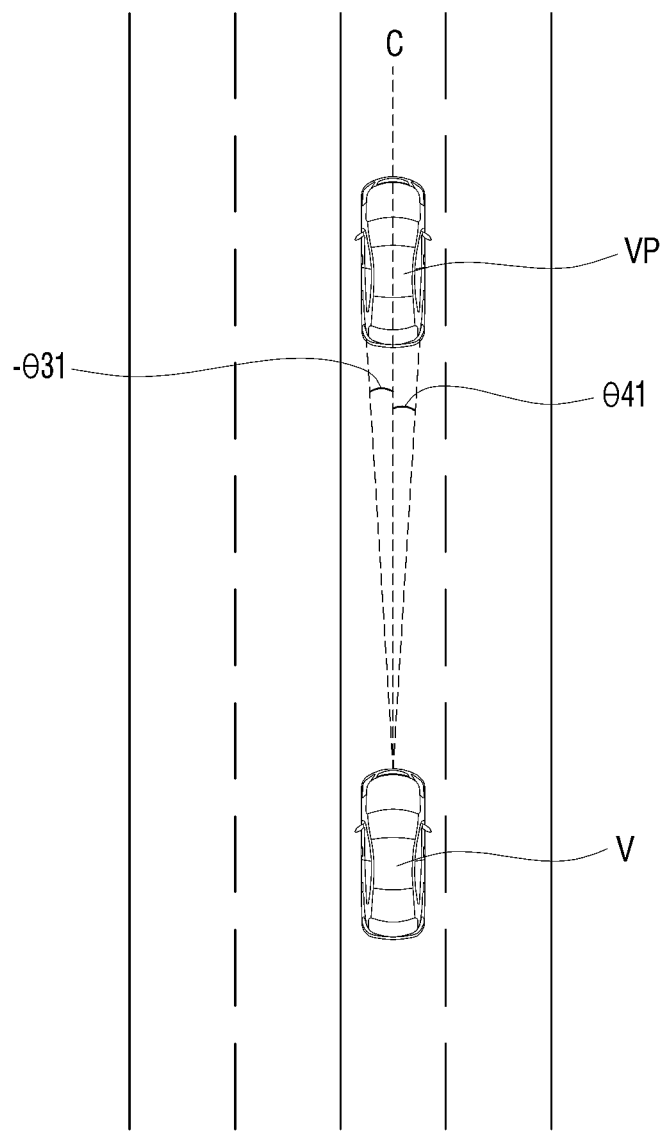
FIGS. 20 and 21 are schematic views illustrating an angle between the instant vehicle and the opposite vehicle according to the location of the preceding vehicle according to the exemplary embodiment of the present disclosure.
Figure 21:
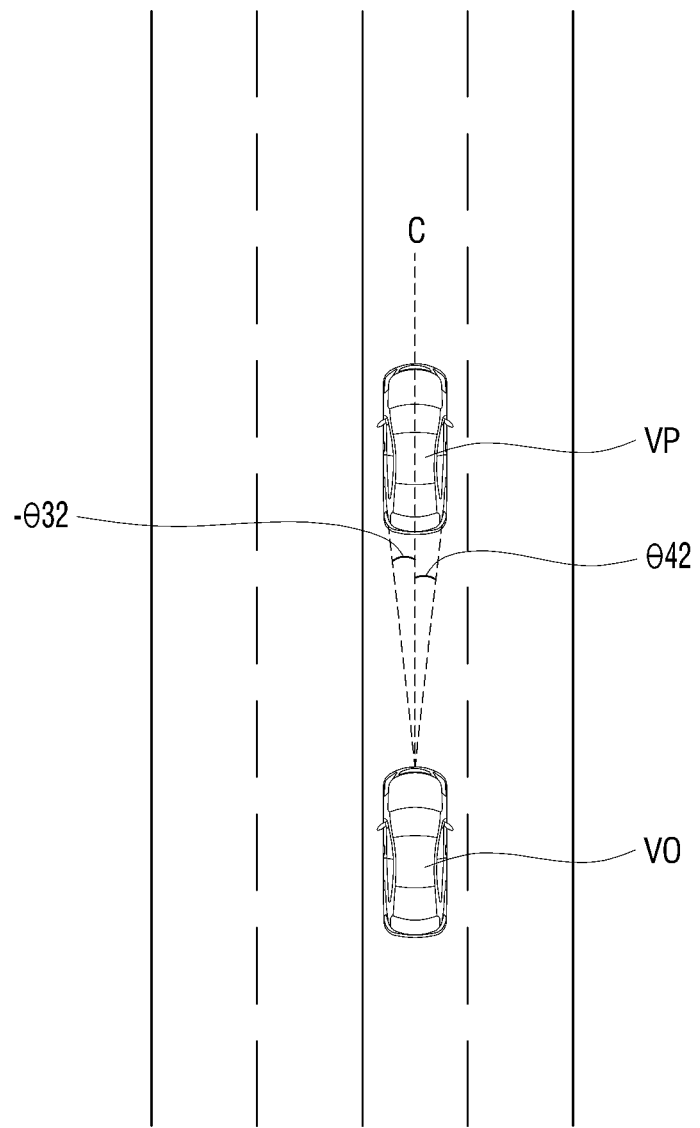

Similarly, the control component 500 may calculate an angle variation rate through differences, that is, θ42−θ41 and −θ32−(−θ31) between angles −θ31 and θ41 each formed by the left tail lamp and the right tail lamp of the preceding vehicle VP with respect to the reference line C of the instant vehicle V at a previous time step with respect to a predetermined period as shown in FIG. 20 and angles −θ32 and θ42 each formed by the left tail lamp and the right tail lamp of the preceding vehicle VP with respect to the reference line C of the instant vehicle V at the present time step as shown in FIG. 21. When the angle variation rate is greater than or equal to a threshold value, the widths of the variable ranges Wv to be added to both sides of the preceding vehicle VP at a next time step with respect to the predetermined period may be determined.

For example, a distance between the instant vehicle V and the preceding vehicle VP may decrease when the driving velocity of the instant vehicle V is greater than the driving velocity of the preceding vehicle VP, which is in a same driving lane as the instant vehicle V. In this case, the angle formed by the left tail lamp of the preceding vehicle VP and the reference line C of the instant vehicle V may increase in a negative direction, and the angle formed by the right tail lamp of the preceding vehicle VP and the reference line C of the instant vehicle V may increase in a positive direction.

The control component 500 may add the variable range Wv to a left side of the preceding vehicle VP when a difference between the angle of the left tail lamp of the preceding vehicle VP at the present time step and the angle of the left tail lamp of the preceding vehicle VP at the previous time step with respect to the present time step has a negative value and is greater than or equal to the threshold value. Similarly, the control component 500 may add the variable range Wv to a right side of the preceding vehicle VP when a difference between the angle of the right tail lamp of the preceding vehicle VP at the present time step and the angle of the right tail lamp of the preceding vehicle VP at the previous time step has a positive value and is greater than or equal to the threshold value. In the present disclosure, the expression that a negative value is greater than a threshold value may be understood to mean that an absolute value of the negative value is greater than an absolute value of the threshold value. For example, −2 degrees may be said to be greater than a threshold value of 1 degree or −1 degree.

In other words, a case in which an angle variation rate of the preceding vehicle VP between the previous time step and the present time step is greater than or equal to the threshold value may be understood as a case in which the driving velocity of the instant vehicle V is faster than the driving velocity of the preceding vehicle VP, and thus a distance between the instant vehicle V and the preceding vehicle VP decreases. In this case, since location variation of the preceding vehicle VP is relatively larger, the variable ranges Wv may be added to the fixed ranges Ws to prevent generation of glare toward a driver of the preceding vehicle VP at the next time step.

Figure 22:
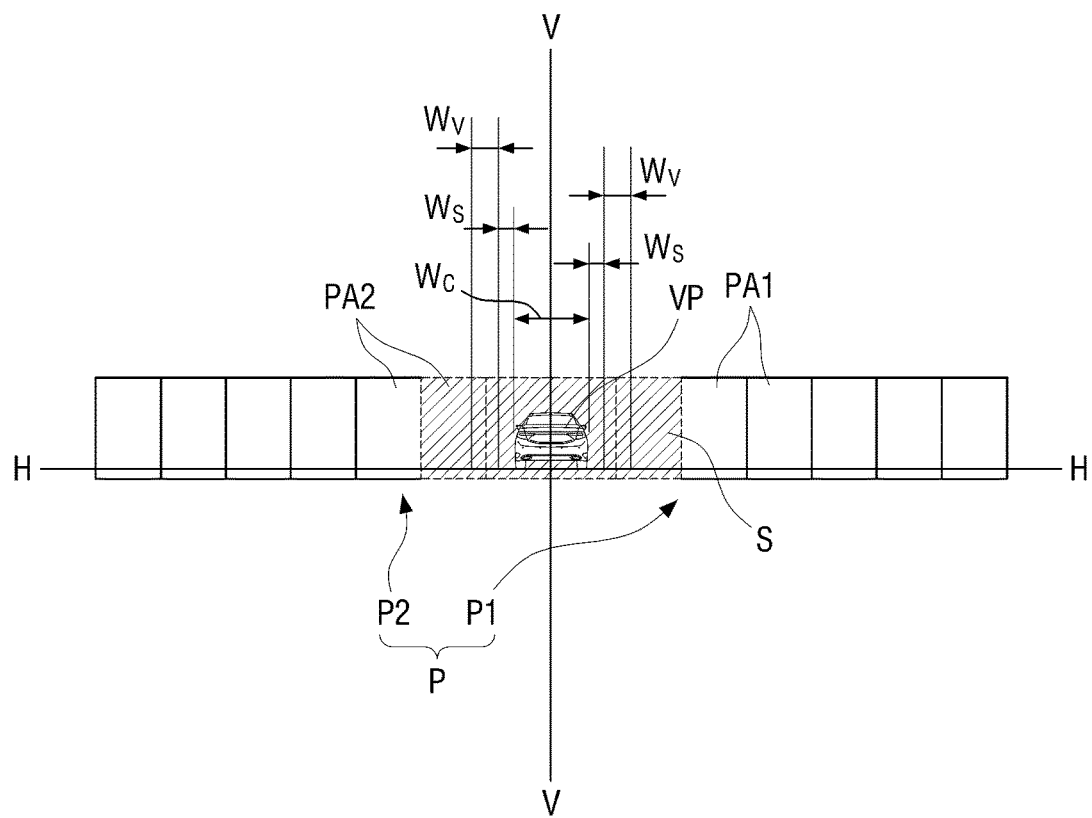
FIGS. 22 and 23 are schematic views illustrating a shadow area according to an angle variation rate of the preceding vehicle according to the exemplary embodiment of the present disclosure.
Figure 23:
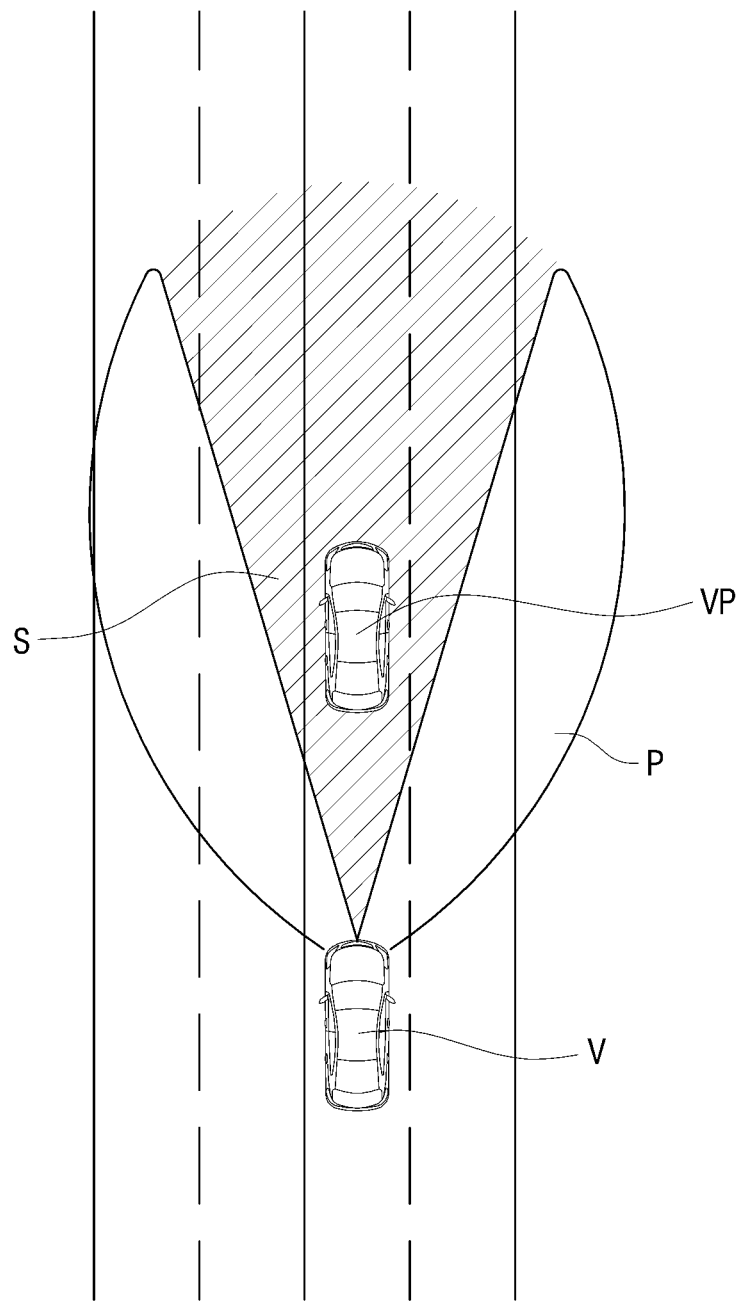

As described above, when the angle variation rate of both tail lamps of the preceding vehicle VP is greater than or equal to the threshold value, a light emitting area that forms the pattern area which includes at least a part of each of the width We of the preceding vehicle VP, the fixed ranges Ws added to both sides of the preceding vehicle VP, and the variable ranges Wv added to both sides of the preceding vehicle VP among the plurality of pattern areas PA1 and PA2 included in the beam pattern P may be turned off to form a shadow area, which may have a greater range than the range of the shadow area formed when only the fixed ranges Ws are added, at the next time step as shown in FIG. 22 and FIG. 23.

As described above, in the lamp for a vehicle 1 of the present disclosure, since the width of the variable range Wv added to at least one of both sides of the front vehicle becomes variable based on the angle variation rate of the front vehicle, the adjusted shadow area may be formed when the distance between the instant vehicle and the front vehicle increases or decreases.

Figure 24:
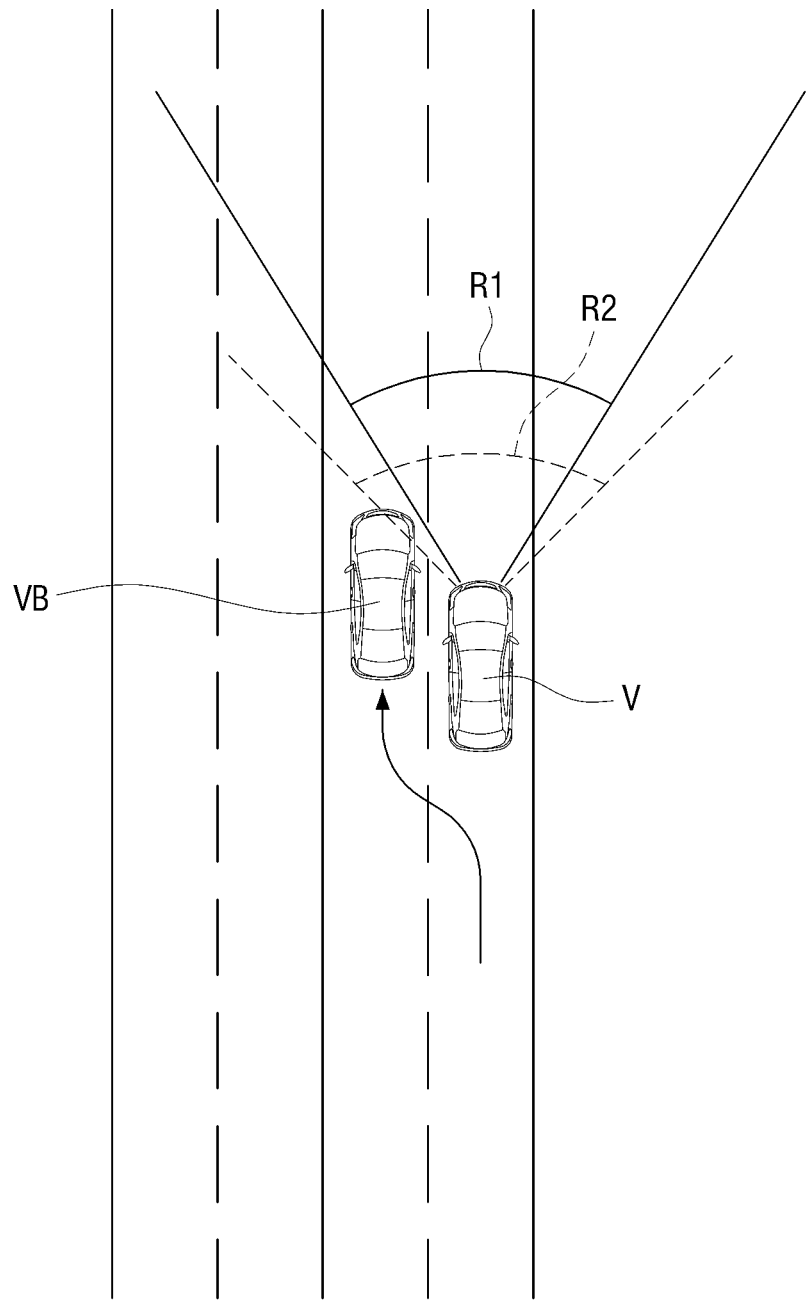
FIG. 24 is a schematic view illustrating a passing vehicle which enters the image acquisition range of the image acquisition component according to the exemplary embodiment of the present disclosure.
Figure 25:
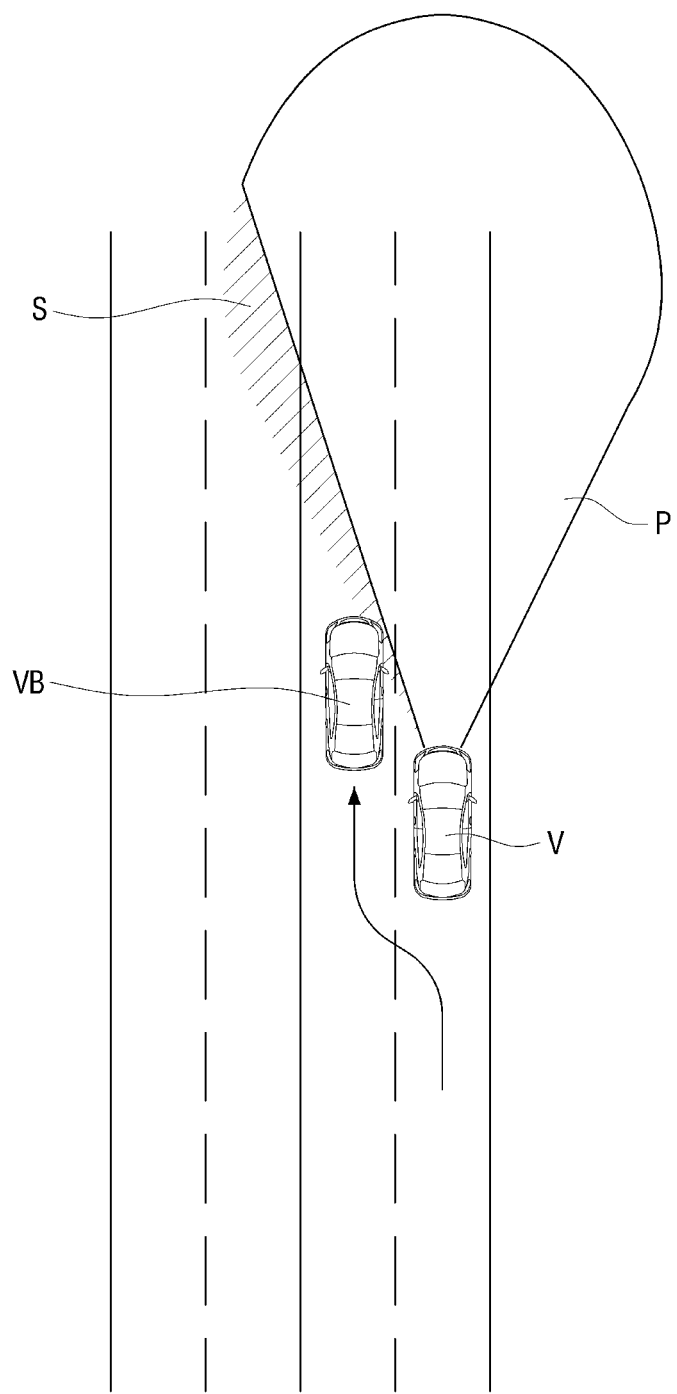
FIGS. 25 and 26 are schematic views illustrating a shadow area according to a location of the passing vehicle according to the exemplary embodiment of the present disclosure.
Figure 26:
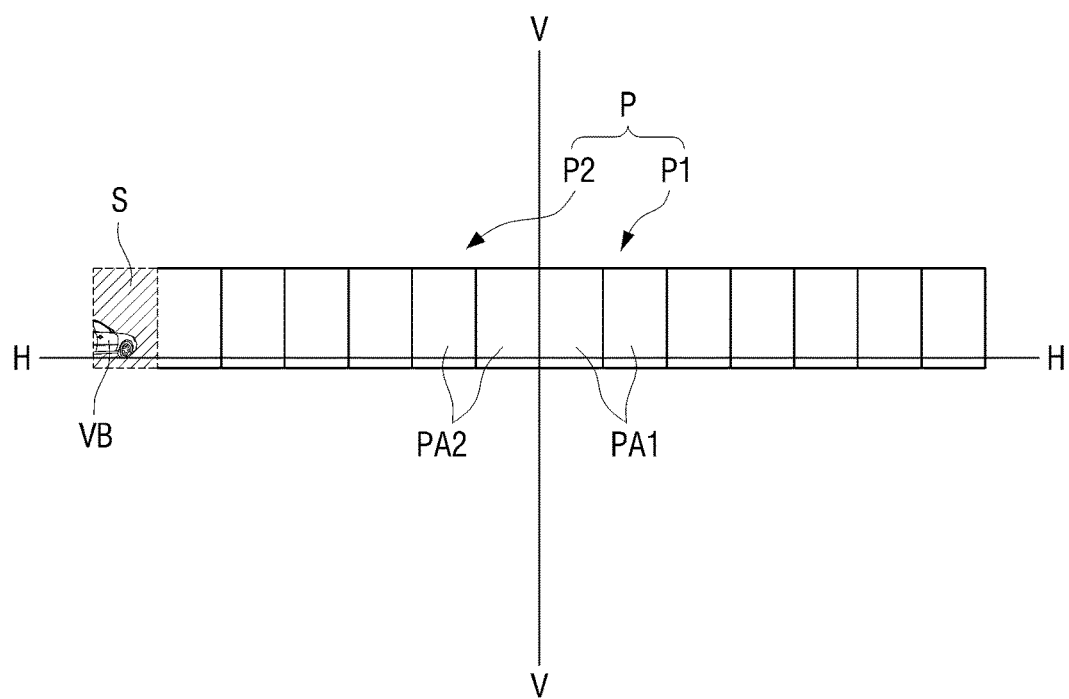

Moreover, in the exemplary embodiment of the present disclosure, since the light irradiation range R1 of the lamp component 100 is smaller than the image acquisition range R2 of the image acquisition component 200, a passing vehicle VB which passes the instant vehicle V from the rear may be sensed before entering the light irradiation range R1 as shown in FIG. 24. In this case, the shadow area S may be formed without glare when the passing vehicle VB passes the instant vehicle V as shown in FIGS. 25 and 26, and the adjusted shadow area may be formed by the above-described fixed ranges Ws and variable ranges Wv when the passing vehicle VB is disposed in front of the instant vehicle V.

Figure 27:
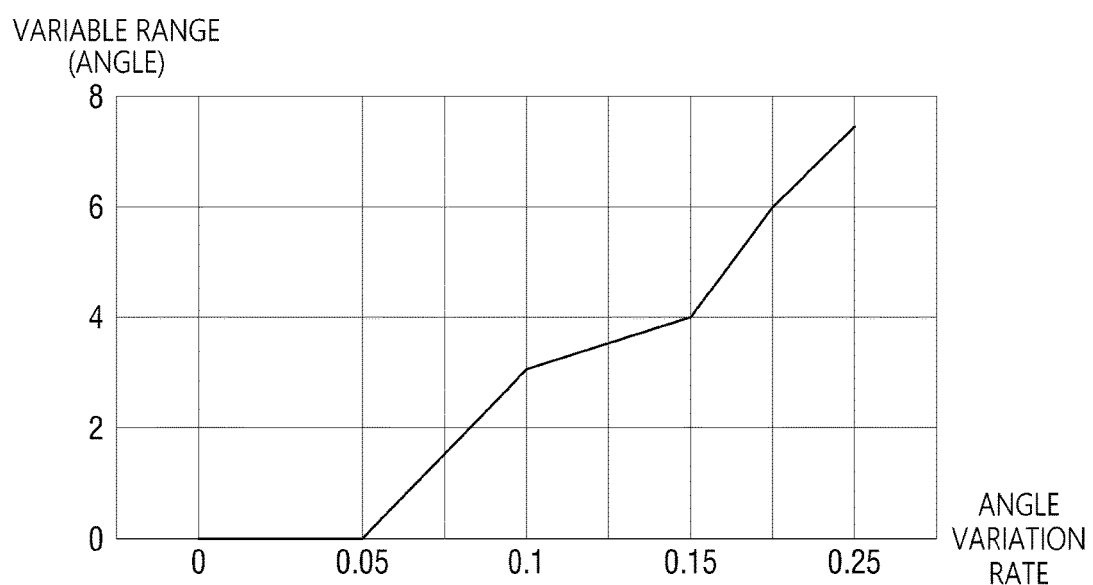
FIGS. 27 and 28 are schematic views illustrating variable ranges on the basis of an angle variation rate according to the exemplary embodiment of the present disclosure.
Figure 28:
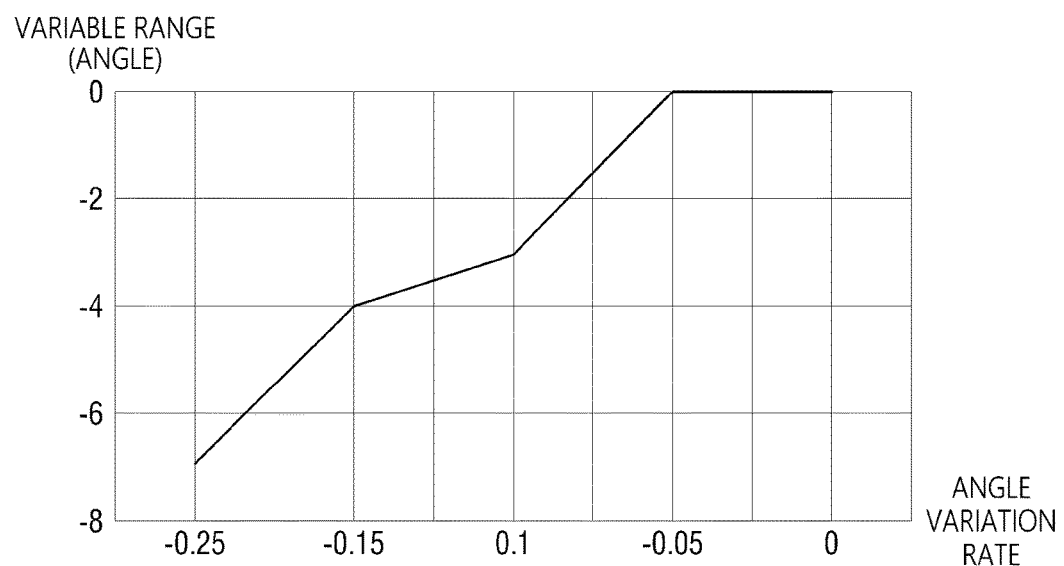

The variable ranges Wv may be added when the angle variation rate is greater than or equal to the threshold value, and in the exemplary embodiment of the present disclosure, as shown in FIGS. 27 and 28, an example is described in which the variable ranges Wv increase linearly when the angle variation rate is greater than or equal to 0.05 and −0.05, which may be the threshold values, and the variable ranges Wv may be indicated as a light irradiation angle.

In the exemplary embodiment of the present disclosure, the variable ranges Wv and the angle variation rate may each have the positive value or the negative value to indicate directions with respect to the center of the instant vehicle. FIG. 27 is an example in which the variable range Wv added to the right side of the front vehicle when the front vehicle moves in a right direction with respect to the instant vehicle, and FIG. 28 is an example in which the variable range Wv added to the left side of the front vehicle when the front vehicle moves in a left direction with respect to the instant vehicle.

Accordingly, since both head lamps of the opposite vehicle move in a left direction when moving closer to the instant vehicle, the variable ranges Wv may be determined based on the above-described FIG. 28, and since the left tail lamp of the preceding vehicle moves in a left direction when moving closer to the instant vehicle, and the right tail lamp moves in a right direction when moving closer to the instant vehicle, the variable ranges Wv may be determined based on the above-described FIGS. 27 and 28.

In the exemplary embodiment of the present disclosure, although an example is described in which the angle variation rate is divided into a plurality of sections when the angle variation rate is greater than or equal to the threshold value, and increasing rates of the variable ranges are different at two sections adjacent to each other, since the above is merely an example for understanding the present disclosure, the increasing rates of the variable ranges may be the same at every section when the angle variation rate is greater than or equal to the threshold value.

Figure 29:
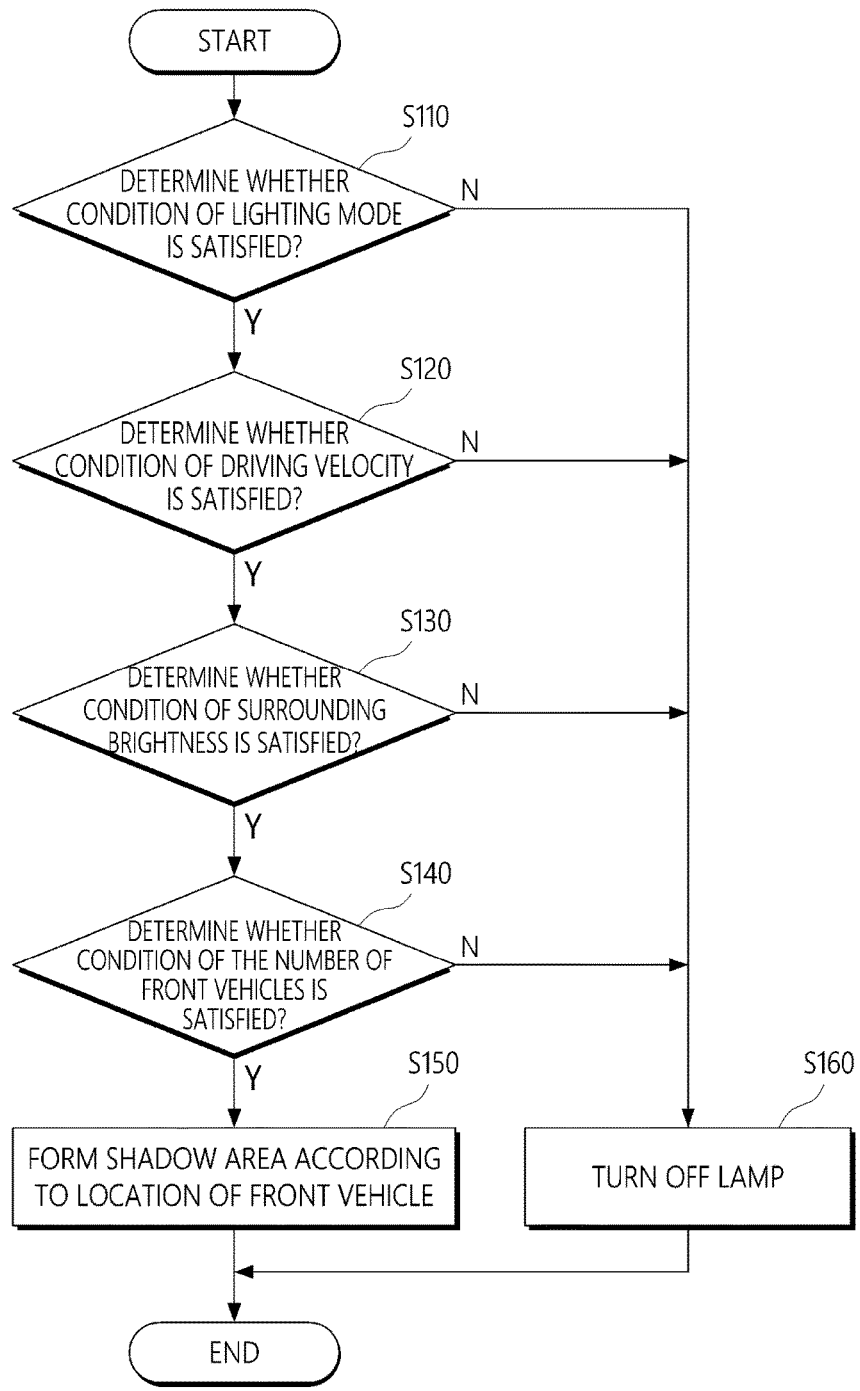
FIG. 29 is a flow chart illustrating a method of controlling the lamp for a vehicle according to the exemplary embodiment of the present disclosure.

FIG. 29 is a flow chart that illustrates a method of controlling the lamp for a vehicle according to the exemplary embodiment of the present disclosure. Referring to FIG. 29, the method of controlling the lamp for a vehicle according to the exemplary embodiment of the present disclosure may include sensing a lighting mode, and subsequently determining whether the sensed lighting mode satisfies a condition for forming a shadow area (S110). In the exemplary embodiment of the present disclosure, the lamp for a vehicle may form a high beam pattern and form the shadow area based on the location of the front vehicle and whether the second mode and the third mode among the above-described first to third modes are selected together may be sensed.

When a case in which the second mode and the third mode are selected is sensed, the driving velocity of the vehicle may be sensed, and whether the sensed driving velocity satisfies the condition for forming the shadow area may be determined (S120). In other words, when the driving velocity of the vehicle is greater than or equal to the first reference velocity in which securing the distant view of the vehicle is required, the lamp component 100 may be turned on.

When the driving velocity of the vehicle is greater than or equal to the first reference velocity, whether the surrounding brightness of the vehicle is lower than the reference brightness for forming the shadow area may be sensed (S130), since a glare prevention effect due to forming of the shadow area may be difficult to acquire when the surrounding brightness of the vehicle is higher than the reference brightness.

When the surrounding brightness of the vehicle is lower than the reference brightness, the number of front vehicles may be determined (S140) to turn off the lamp component 100 since almost every light emitting area may require to be turned off to form the shadow area when the number of front vehicles is greater than or equal to the predetermined number.

In the exemplary embodiment of the present disclosure, although an example is described in which the condition for forming the shadow area is determined in an order of operations S110 to S140, since the above is merely an example for understanding the present disclosure, the order of operations S110 to S140 may be varied, and when all of operations S110 to S140 are satisfied, the shadow area may be formed by lighting the lamp component 100 and then adding the fixed range Ws or the fixed range Ws and the variable range Wv to at least one of both sides of the front vehicle in addition to the width of the front vehicle (S150). Furthermore, when at least one of the above-described operations S110 to S140 is satisfied, the lamp component 100 may be turned off (S160).

As described above, the lamp for a vehicle of the present disclosure may form the shadow area by adding the fixed ranges to the width of the front vehicle or by adding the fixed ranges and the variable ranges to the width of the front vehicle based on the angle variation rate of the front vehicle to adjust the shadow area when a relative location between the instant vehicle and the front vehicle changes.

The above-described lamp for a vehicle of the present disclosure may achieve at least one of the following effects. Since a shadow area is formed at an area that corresponds to a location of a front vehicle based on a lighting mode selected by a driver, driver convenience may be improved. Further, since the shadow area is formed based on fixed ranges added to both sides of the front vehicle, glare may be prevented when the front vehicle moves out of the shadow area due to a time delay while recognizing the front vehicle and forming the shadow area. In addition, since a shadow area is formed based on a variable range added to at least one of both sides of the front vehicle to have a width which may be varied based on an angle variation rate of the front vehicle, an adjusted shadow area may be formed when location of the front vehicle varies.

It should be noted that effects of the present disclosure are not limited to the above-mentioned effects, and other effects of the present disclosure will be apparent to those skilled in the art from descriptions in the claim. Those skilled in the art of the present disclosure may understand that the present disclosure may be embodied in other specific forms without changing the technical spirit or essential characteristics. Accordingly, the above described embodiments should be understood to be exemplary and not limiting. The scope of the present disclosure is shown by the claims, and all variations or different forms derived from the means, scope, and equivalents of the claims should be interpreted to be included in the scope of the present disclosure.

What is claimed is:

1. A lamp for a vehicle comprising:
    a lamp component to form a beam pattern that includes a plurality of pattern areas;
    an image acquisition component to acquire a forward view image of the vehicle at a predetermined period;
    a recognition component to recognize a front vehicle from the forward view image; and
    a control component to control a light amount of at least one pattern area that corresponds to the front vehicle among the plurality of pattern areas to form a shadow area,
    wherein the at least one pattern area to be controlled includes a width of the front vehicle and predetermined fixed ranges added to both sides of the front vehicle,
    wherein the at least one pattern area to be controlled further includes a variable range having a variable width added to at least one of the fixed ranges of the both sides of the front vehicle,
    wherein the recognition component determines at least one of a first angle of a left side of the front vehicle and a second angle of a right side of the front vehicle with respect to a reference line parallel to a driving direction of the vehicle, and
    wherein the control component determines the variable width added to the at least one of the fixed ranges based on a predetermined correlation between the variable width of the variable range and an angle variation rate of the first angle or the second angle during the predetermined period.

2. The lamp for the vehicle of claim 1, wherein an image acquisition range of the image acquisition component is larger than a light irradiation range of the lamp component.

3. The lamp for the vehicle of claim 1, wherein the predetermined fixed ranges added to respective sides of the front vehicle have a same width.

4. The lamp for the vehicle of claim 1, wherein the predetermined fixed ranges added to respective sides of the front vehicle have different widths.

5. The lamp for the vehicle of claim 4, wherein the predetermined fixed ranges are set to be greater in a first direction than in a second direction that is opposite to the first direction, wherein the first direction is a direction toward which an on-coming vehicle is disposed with respect to the vehicle.

6. The lamp for the vehicle of claim 1, wherein the control component adds the variable range when the angle variation rate is greater than or equal to a preset threshold value.

7. The lamp for the vehicle of claim 1, wherein the control component varies the width of the variable range in a direction to which the angle of the front vehicle varies during the predetermined period.

8. The lamp for the vehicle of claim 1, wherein the control component calculates angle variation rates of both sides of the front vehicle to determine respective widths of the variable range to be added to both sides of the front vehicle.

9. The lamp for the vehicle of claim 1, wherein the width of the variable range is increased when the angle variation rate increases.

10. The lamp for the vehicle of claim 9, wherein the width of the variable range is increased linearly when the angle variation rate increases.

11. A method for controlling a lamp for a vehicle, comprising:

acquiring, by an image acquisition component, a forward view image of the vehicle at a predetermined period;

recognizing, by a recognition component, a front vehicle from the forward view image; and adjusting, by a control component, a light amount of at least one pattern area that corresponds to the front vehicle among the plurality of pattern areas to form a shadow area, wherein the at least one pattern area to be controlled includes a width of the front vehicle and predetermined fixed ranges added to both sides of the front vehicle, wherein the at least one pattern area to be controlled further includes a variable range having a variable width added to at least one of the fixed ranges of the both sides of the front vehicle, and wherein the adjusting the light amount of the at least one pattern area further comprises:

determining, by the recognition component, at least one of a first angle of a left side of the front vehicle and a second angle of a right side of the front vehicle with respect to a reference line parallel to a driving direction of the vehicle, and determining, by the control component, the variable width added to the at least one of the fixed ranges based on a predetermined correlation between the variable width of the variable range and an angle variation rate of the first angle or the second angle during the predetermined period.

\* \* \* \* \*